US012792769B2

(12) United States Patent
Liu et al.

(10) Patent No.: US 12,792,769 B2
(45) Date of Patent: Nov. 10, 2026

(54) PRIVACY-PRESERVING CLUSTERING METHODS AND APPARATUSES

(71) Applicant: Alipay (Hangzhou) Information Technology Co., Ltd., Hangzhou (CN)

(72) Inventors: Yingting Liu, Hangzhou (CN); Li Wang, Hangzhou (CN); Lei Wang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 232 days.

(21) Appl. No.: 18/323,919

(22) Filed: May 25, 2023

(65) Prior Publication Data

US 2023/0385446 A1 Nov. 30, 2023

(30) Foreign Application Priority Data

May 25, 2022 (CN) ......................... 202210574168.8

(51) Int. Cl.
*G06F 21/62* (2013.01)
*G06F 16/35* (2025.01)
(Continued)

(52) U.S. Cl.
CPC .......... *G06F 21/6245* (2013.01); *G06F 16/35* (2019.01); *G06F 18/23* (2023.01); *H04L 9/008* (2013.01); *H04L 2209/46* (2013.01)

(58) Field of Classification Search
CPC ...... G06F 21/60; G06F 21/62; G06F 21/6218; G06F 21/6245; G06F 16/30; G06F 16/35;
(Continued)

(56) References Cited

U.S. PATENT DOCUMENTS

2018/0373834 A1 12/2018 Cho et al.
2020/0034566 A1 1/2020 Zhang et al.
(Continued)

FOREIGN PATENT DOCUMENTS

CN 108959567 A 12/2018
CN 111160573 A 5/2020
(Continued)

OTHER PUBLICATIONS

Erkin et al., "Privacy-preserving user clustering in a social network," 2009 First IEEE International Workshop on Information Forensics and Security (WIFS), London, UK, pp. 96-100. (Year: 2009).*

(Continued)

*Primary Examiner* — D'arcy Winston Straub
(74) *Attorney, Agent, or Firm* — Fish & Richardson P.C.

(57) ABSTRACT

Implementations of the present specification disclose methods, apparatuses, and devices for privacy-preserving multi-party joint data clustering. In one aspect, the method includes: performing, based on a first feature matrix associated with a first party and a first centroid partition of a current centroid matrix, a first multi-party secure calculation with a second party associated with a second feature matrix to obtain a first distance partition of a distance matrix; performing, based on the first distance partition, a secure comparison calculation with the second party with respect to a second distance partition of the distance matrix associated with the second party to obtain a first index partition of a cluster index matrix; and performing, based on the first feature matrix and the first index partition, a second multi-party secure calculation with the second party to obtain an updated first centroid partition in the current iteration.

20 Claims, 6 Drawing Sheets

(51) Int. Cl.
*G06F 18/23* (2023.01)
*H04L 9/00* (2022.01)

(58) Field of Classification Search
CPC ......... G06F 18/20; G06F 18/23; H04L 9/008; H04L 2209/46
See application file for complete search history.

(56) References Cited

U.S. PATENT DOCUMENTS

| | | | |
|---|---|---|---|
| 2021/0051008 A1 | 2/2021 | Li et al. | |
| 2021/0133587 A1* | 5/2021 | Mohassel | G06F 18/24137 |
| 2022/0004646 A1 | 1/2022 | Chen et al. | |
| 2022/0394102 A1 | 12/2022 | Wang et al. | |

FOREIGN PATENT DOCUMENTS

| | | |
|---|---|---|
| CN | 111178549 A | 5/2020 |
| CN | 113098687 A | 7/2021 |
| IN | 202041037547 A | 3/2022 |

OTHER PUBLICATIONS

Chen et al., KDD '21: Proceedings of the 27th ACM SIGKDD Conference on Knowledge Discovery & Data Mining pp. 2652-266. (Year: 2021).*

Mohassel et al., Proceedings on Privacy Enhancing Technologies Symposium, vol. 2020, Issue 4, pp. 414-433. (Year: 2020).*

Ghosal et al., "Privacy preserving multi-server k-means computation over horizontally partitioned data." Information Systems Security: 14th International Conference, ICISS 2018, Bangalore, India, Proceedings 14. Springer International Publishing. (Year: 2018).*

Chen et al., "When Homomorphic Encryption Marries Secret Sharing: Secure Large-Scale Sparse Logistic Regression and Applications in Risk Control," In Proceedings of the 27th ACM SIGKDD Conference on Knowledge Discovery & Data Mining, Aug. 14, 2021, pp. 2652-2662.

eprint.iacr.org [online], "Practical Privacy-Preserving Kmeans Clustering," Oct. 5, 2019, retrieved on Oct. 8, 2019, retrieved from URL<http://eprint.iacr.org/2019/1158.pdf>, 30 pages.

Extended European Search Report in European Appln. No. 23175075.3, mailed on Oct. 16, 2023, 8 pages.

Jäschke et al., "Unsupervised machine learning on encrypted data," In International conference on selected areas in cryptography, Aug. 15, 2018 , p. 453-478.

Mohassel et al., "SecureML: A system for scalable privacy-preserving machine learning," In2017 IEEE symposium on security and privacy (SP), May 22, 2017, p. 19-38.

Sumana et al., "Grouping of Distributed Data at Multiple Sites by Sustaining the Privacy of Data," Procedia Computer Science, Jan. 1, 2020, 171:1688-97, 10 pages.

Nie et al., "A Matrix Multiplication Outsourcing Calculation Scheme in Cloud Environment," Computer Technology and Development, Aug. 2018, 28(8):119-123 (with English abstract).

Zhou et al., "Research Advances on Privacy Preserving in Edge Computing," Journal of Computer Research and Development, Oct. 2020, 57(10):2027-2051 (with English abstract).

* cited by examiner

PRIVACY-PRESERVING CLUSTERING METHODS AND APPARATUSES

CROSS-REFERENCE TO RELATED APPLICATIONS

This application claims priority to Chinese Patent Application No. 202210574168.8, filed on May 25, 2022, which is hereby incorporated by reference in its entirety.

TECHNICAL FIELD

This specification relates to the field of privacy protection technologies, and in particular, to privacy-preserving clustering methods and apparatuses.

BACKGROUND

K-means clustering has been widely used in many applications such as document clustering, targeted marketing, image segmentation, user classification, and feature learning. However, the current concern about data privacy and the situation of data silos have become serious problems. For example, in a user classification application scenario, a bank holds data such as assets and credits of a user, and an e-commerce platform holds consumption data of the user. In such a scenario, when two parties jointly perform clustering, one party sends the data it holds to the other parties, and the other parties perform joint clustering based on the data it holds and all the data sent by each other. In such a process, data associated with either party is exposed when the party sends the data it holds to the other parties. At present, stricter privacy protection regulations hinder data sharing among multiple data owners. Therefore, how to provide a privacy-preserving multi-party joint data clustering method becomes an issue to be urgently alleviated.

SUMMARY

One or more embodiments of this specification provide privacy-preserving multi-party joint data clustering methods and apparatuses so as to enable multiple data owners to perform data clustering while protecting their own private data.

According to a first aspect, a privacy-preserving multi-party joint data clustering method is provided, where the method involves a first party and a second party, the first party and the second party hold a first feature matrix and a second feature matrix, respectively, the first feature matrix and the second feature matrix together comprise all sample objects to be clustered, the method is performed by the first party and includes a plurality of rounds of iterations, and each round of iterations includes: performing a first multi-party secure calculation based on secure matrix multiplication with the second party based on the first feature matrix and a first centroid partition of a current centroid matrix to obtain a first distance partition of a distance matrix, where the distance matrix represents distances between all the sample objects and current centroids of clusters, and a second distance partition of the distance matrix is held by the second party; performing a secure comparison calculation with the second party with respect to the second distance partition held by the second party based on the first distance partition to obtain a first index partition of a cluster index matrix, where the cluster index matrix represents clusters that all the sample objects respectively belong to, and a second index partition of the cluster index matrix is held by the second party; and performing a second multi-party secure calculation with the second party based on the first feature matrix and the first index partition to obtain an updated first centroid partition in the current round of iterations, where an updated second centroid partition is held by the second party.

In some optional implementations, the first multi-party secure calculation includes: performing a secure calculation including secure matrix multiplication based on the first centroid partition and the second centroid partition held by the second party to determine a first intermediate result; performing a local computation based on the first feature matrix and the first centroid partition to determine a second intermediate result; performing secure matrix multiplication based on the first feature matrix and the second centroid partition held by the second party to determine a third intermediate result; performing secure matrix multiplication based on the first centroid partition and the second feature matrix held by the second party to determine a fourth intermediate result; and determining the first distance partition based on the first intermediate result, the second intermediate result, the third intermediate result, and the fourth intermediate result.

In some optional implementations, the first feature matrix is a matrix of all features of a first portion of all the sample objects, the second feature matrix is a matrix of all features of a second portion of all the sample objects, and each of the current centroid matrix and the first centroid partition has d*k dimensions, where d represents a dimension of all the features and k represents a predetermined cluster number.

In some optional implementations, the first feature matrix is a matrix of a first portion of features of all the sample objects and the second feature matrix is a matrix of a second portion of features of all the sample objects; the current centroid matrix includes a first submatrix corresponding to the first portion of features and a second submatrix corresponding to the second portion of features; the first centroid partition includes a first-party partition of the first submatrix and a first-party partition of the second submatrix; the second centroid partition includes a second-party partition of the first submatrix and a second-party partition of the second submatrix; the determining a third intermediate result includes performing secure matrix multiplication based on the first feature matrix and the second-party partition of the first submatrix held by the second party to obtain the third intermediate result; the determining a fourth intermediate result includes performing secure matrix multiplication based on the first-party partition of the second submatrix and the second feature matrix held by the second party to obtain the fourth intermediate result.

In some optional implementations, the first feature matrix is a matrix of first feature partitions of all features of all the sample objects, the second feature matrix is a matrix of second feature partitions of all features of all the sample objects, and each of the current centroid matrix and the first centroid partition has k*d dimensions, where d represents a dimension of all the features and k represents a predetermined cluster number.

In some optional implementations, the secure matrix multiplication is a general matrix multiplication based on a secret sharing protocol, or a sparse matrix multiplication based on a homomorphic encryption protocol and a secret sharing protocol.

In some optional implementations, the secure matrix multiplication is a sparse matrix multiplication based on a homomorphic encryption protocol and a secret sharing protocol; and the determining a third intermediate result includes: obtaining a second centroid partition ciphertext, where the second centroid partition ciphertext is obtained by the second party by performing homomorphic encryption on the second centroid partition by using a first target public key; calculating a product of the first feature matrix and the second centroid partition ciphertext to obtain a first product ciphertext; generating a first random matrix as a first result partition of the first product ciphertext, and using the first result partition as the third intermediate result; and determining a second result partition ciphertext of the first product ciphertext based on the first product ciphertext and the first random matrix, and sending the second result partition ciphertext to the second party so that the second party decrypts the second result partition ciphertext to obtain a second result partition as a second-party intermediate result corresponding to the third intermediate result.

In some optional implementations, the secure matrix multiplication is a sparse matrix multiplication based on a homomorphic encryption protocol and a secret sharing protocol; and the determining a third intermediate result includes: encrypting the first feature matrix by using a second target public key to obtain a first matrix ciphertext, and sending the first matrix ciphertext to the second party; and receiving a third result partition ciphertext from the second party, and decrypting the third result partition ciphertext to obtain a third result partition plaintext as the third intermediate result, where the third result partition ciphertext is determined by the second party based on a second product ciphertext and a second random matrix generated by the second party, the second product ciphertext is a product result of the first matrix ciphertext and the second centroid partition held by the second party, and the second random matrix is used as a second-party intermediate result held by the second party corresponding to the third intermediate result.

In some optional implementations, the obtaining a first index partition of a cluster index matrix includes: constructing leaf nodes of a binary tree based on a predetermined cluster number k; with respect to two adjacent clusters among clusters indicated by layer nodes of the binary tree for any sample object, executing a secure comparison algorithm with the second party by using two distance value partitions of the sample object corresponding to the two clusters in the first distance partition to obtain a cluster with a closer distance as a next layer node until a root node is reached; and determining the first index partition based on a root node of each sample object.

In some optional implementations, the obtaining an updated first centroid partition in the current round of iterations includes: performing secure matrix multiplication based on the first feature matrix and the first index partition as well as the second feature matrix and the second index partition held by the second party to determine a first sum partition of a sum of feature vectors of sample objects belonging to clusters, where a second sum partition of the sum of the feature vectors of the sample objects belonging to the clusters is held by the second party; performing a secure calculation with the second party based on the first index partition to count a quantity of the sample objects belonging to the clusters; and performing secure matrix multiplication with the second party with respect to the second sum partition held by the second party based on the first sum partition and the quantity of the sample objects belonging to the clusters to obtain the updated first centroid partition in the current round of iterations.

In some optional implementations, the round of iterations further includes: performing a secure comparison calculation with the second party based on the first centroid partition of the current centroid matrix, the updated first centroid partition in the current round of iterations, and a predetermined error threshold to obtain a comparison result between the predetermined error threshold and a difference between an updated centroid matrix in the current round of iterations and the current centroid matrix, and determining whether a predetermined iteration stop condition is satisfied based on the comparison result.

In some optional implementations, the round of iterations further includes: determining whether an iteration round reaches a predetermined iteration round threshold, and determining whether a predetermined iteration stop condition is satisfied based on a determination result.

In some optional implementations, the method further includes: if the predetermined iteration stop condition is satisfied, determining a cluster that each sample object belongs to based on the first index partition; and/or determining a centroid of each cluster based on the updated first centroid partition.

According to a second aspect, a privacy-preserving multi-party joint data clustering apparatus is provided, where the apparatus involves a first party and a second party, the first party and the second party hold a first feature matrix and a second feature matrix, respectively, the first feature matrix and the second feature matrix together comprise all sample objects to be clustered, and the apparatus is deployed in the first party and includes a first secure calculation module, a first secure comparison module, and a second secure calculation module that perform a plurality of rounds of iterations; each round of iterations includes: the first secure calculation module, configured to perform a first multi-party secure calculation based on secure matrix multiplication with the second party based on the first feature matrix and a first centroid partition of a current centroid matrix to obtain a first distance partition of a distance matrix, where the distance matrix represents distances between all the sample objects and current centroids of clusters, and a second distance partition of the distance matrix is held by the second party; the first secure comparison module, configured to perform a secure comparison calculation with the second party with respect to the second distance partition held by the second party based on the first distance partition to obtain a first index partition of a cluster index matrix, where the cluster index matrix represents clusters that all the sample objects respectively belong to, and a second index partition of the cluster index matrix is held by the second party; and the second secure calculation module, configured to perform a second multi-party secure calculation with the second party based on the first feature matrix and the first index partition to obtain an updated first centroid partition in the current round of iterations, where an updated second centroid partition is held by the second party.

According to a third aspect, a computer-readable storage medium is provided. The computer-readable storage medium stores a computer program, and when the computer program is executed on a computer, the computer is enabled to perform the method according to the first aspect.

According to a fourth aspect, a computing device is provided, including a memory and a processor. The memory stores executable code, and the processor executes the executable code to implement the method according to the first aspect.

According to the methods and the apparatuses provided in some embodiments of this specification, a first party updates a centroid through a plurality of rounds of iterations, and during each iteration, the first party performs a first multi-party secure calculation based on secure matrix multiplication with a second party based on a first feature matrix and a first centroid partition of a current centroid matrix so as to obtain a first distance partition of a distance matrix representing distances between all sample objects and current centroids of clusters at one single time through matrix calculation. Next, the first party performs a secure comparison calculation with the second party with respect to a second distance partition held by the second party based on the first distance to obtain a first index partition of a cluster index matrix. Then, the first party performs a second multi-party secure calculation with the second party based on the first feature matrix and the first index partition to obtain an updated first centroid partition in the current round of iterations so as to update the centroid. In the above-mentioned process, the first party performs the multi-party secure calculation with the second party to perform data clustering while protecting private data of both parties. In addition, in the distance calculation process, the first multi-party secure calculation is a calculation based on secure matrix multiplication so that the distance matrix representing the distances between all the sample objects and the current centroids of the clusters is obtained by performing the matrix secure calculation once, thereby reducing the calculation amount and the communication traffic in the clustering process and improving the data clustering efficiency.

BRIEF DESCRIPTION OF DRAWINGS

To describe the technical solutions in some embodiments of this application more clearly, the following briefly describes the accompanying drawings needed for describing some embodiments. Clearly, the accompanying drawings in the following description merely illustrate some embodiments of this application, and a person of ordinary skill in the art can derive other drawings from these accompanying drawings without creative efforts.

DESCRIPTION OF EMBODIMENTS

The following describes technical solutions in some embodiments of this specification in detail with reference to accompanying drawings.

Some embodiments of this specification disclose privacy-preserving multi-party joint data clustering methods and apparatuses. First, the application scenarios and technical concepts of the methods are described as follows:

As described previously, at present, stricter privacy protection regulations hinder data sharing among multiple data owners. Therefore, how to provide a privacy-preserving multi-party joint data clustering method becomes an issue to be urgently alleviated.

At present, to solve the above-mentioned problems, a related technology provides a two-party data clustering solution based on data privacy protection. In the solution, each data owner first directly splits a data sample it holds into two data shares, and retains one of the two data shares and shares the other data share with the other parties. Each data owner obtains its own restructured data set based on the data share of each data sample retained by the data owner and the data share of each data sample obtained from the other parties. Then, data clustering is performed between the data owners by using the restructured data sets of the data owners.

In the above-mentioned solution, each data owner splits the data sample it holds into two data shares, and retains one of the two data shares and shares the other data share with the other parties so that each data owner obtains a restructured data set. In the clustering process, a distance between a single data sample and a centroid is determined on a sample-by-sample basis. Specifically, each data owner determines a distance between a data share of a single data sample and a center point (i.e., a centroid) of each current cluster category based on the restructured data set (including one data share of the data sample of the data owner, and one data share of the data sample of the other parties) it holds. In other words, the distance is calculated separately for each data sample, that is, the distance between each value (the data share of each data sample) and the center point of each current cluster category is obtained by operating each value. As such, for a plurality of data samples, the data owner needs to perform the distance calculation for a plurality of times. Consequently, although data owners keep their own data privacy secret during clustering, the data aggregation efficiency is low.

Figure 1:
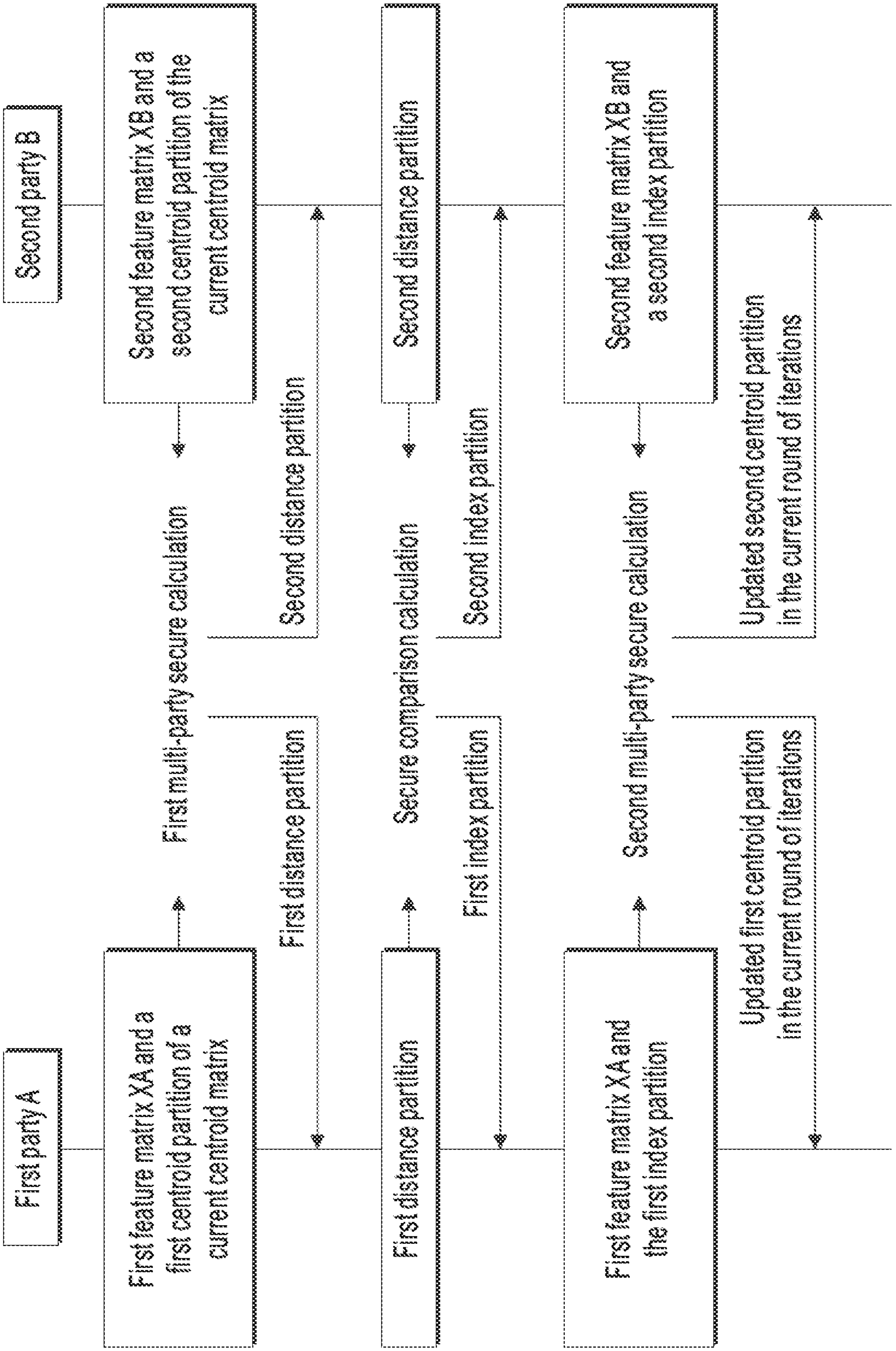
FIG. 1 is a schematic diagram illustrating an implementation framework, according to some embodiments disclosed in this specification.

In view of the previous description, the inventors have proposed a privacy-preserving multi-party joint data clustering method, in which data privacy is kept secret during multi-party joint clustering and data clustering efficiency is improved. FIG. 1 is a schematic diagram illustrating an implementation framework, according to some embodiments disclosed in this specification. The figure shows examples of participants A and B, which can also be referred to as first party A and second party B. Each participant can be implemented as any device, platform, server, or device cluster with computing and processing capabilities. Both parties need to jointly perform data clustering while protecting data privacy.

The first party A holds the first feature matrix XA, the second party B holds the second feature matrix XB, and the first feature matrix XA and the second feature matrix XB are used to form the overall feature matrix x of all sample objects to be clustered. The data clustering process can include centroid initialization and centroid update and iteration.

In some implementations, the first party A and the second party B are original data owners, that is, the first feature matrix XA is a feature matrix belonging to the first party A, and the second feature matrix XB is a feature matrix belonging to the second party B. In some other implementations, the first party A and the second party B are calculators for performing data clustering, and the first feature matrix XA and the second feature matrix XB held by the first party A and the second party B are provided to both of the first party A and the second party B by other (three or more) data owners who need data clustering.

Figure 2A:
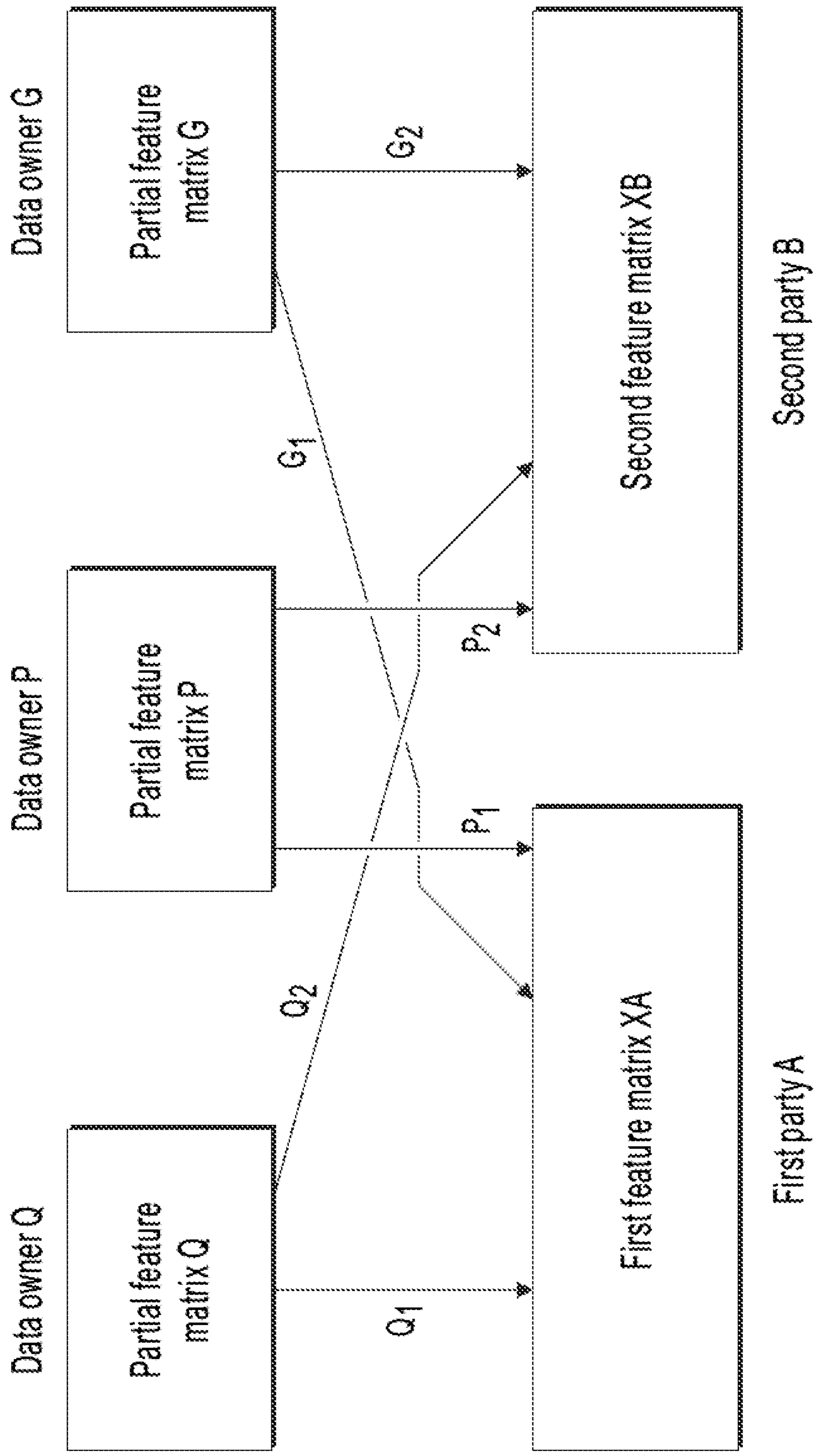
FIG. 2A is a schematic diagram illustrating a process of obtaining a first feature matrix XA and a second feature matrix XB, according to some embodiments.

For example, as shown in FIG. 2A, there are original data owners Q, P, and G. The data owner Q holds a partial feature matrix Q, the data owner P holds a partial feature matrix P, and the data owner G holds a partial feature matrix G. The partial feature matrix Q, the partial feature matrix P, and the partial feature matrix G together comprise all sample objects to be clustered. In such case, the data owner Q divides the partial feature matrix Q it holds into two partitions, namely, a partial feature matrix partition $Q_1$ and a partial feature matrix partition $Q_2$, sends the partial feature matrix partition $Q_1$ to the first party A, and sends the partial feature matrix partition $Q_2$ to the second party B. The data owner P divides the partial feature matrix P it holds into two partitions, namely, a partial feature matrix partition $P_1$ and a partial feature matrix partition $P_2$, sends the partial feature matrix partition $P_1$ to the first party A, and sends the partial feature matrix partition $P_2$ to the second party B. The data owner G divides the partial feature matrix G it holds into two partitions, namely, a partial feature matrix partition $G_1$ and a partial feature matrix partition $G_2$, sends the partial feature matrix partition $G_1$ to the first party A, and sends the partial feature matrix partition $G_2$ to the second party B.

Correspondingly, the first party A combines the partial feature matrix partition $Q_1$, the partial feature matrix partition $P_1$, and the partial feature matrix partition $G_1$ into the first feature matrix XA, and the second party B combines the partial feature matrix partition $Q_2$, the partial feature matrix partition $P_2$, and the partial feature matrix partition $G_2$ into the second feature matrix XB.

After the first party A obtains its first feature matrix XA, and the second party B obtains its second feature matrix XB, the first party A and the second party B can first perform centroid initialization so that the first party A obtains one partition of the initial centroid matrix (which can be denoted as centroid matrix $\mu^{(0)}$), and the second party B obtains the other partition of the initial centroid matrix $\mu^{(0)}$. Next, the first party A and the second party B perform a plurality of rounds of centroid updates and iterations, as shown in FIG. 1. Each round of iterations (e.g., the $t^{th}$ round of iterations) includes the following:

The first party A performs a first multi-party secure calculation based on the first feature matrix XA and the first centroid partition $<\mu^{(t-1)}>_A$ of the current centroid matrix $\mu^{(t-1)}$ (i.e., the centroid matrix after the above-mentioned round of iterations) as well as the second feature matrix XB held by the second party B and the second centroid partition $<\mu^{(t-1)}>_B$ of the current centroid matrix $\mu^{(t-1)}$ to obtain a first distance partition $<D^{(t)}>_A$ of a distance matrix $D^{(t)}$. The distance matrix $D^{(t)}$ represents distances between all the sample objects and current centroids of clusters c, and a second distance partition $<D^{(t)}>_B$ of the distance matrix $D^{(t)}$ is held by the second party B.

Next, the first party A performs a secure comparison calculation with the second party B with respect to the second distance partition $<D^{(t)}>_B$ held by the second party B based on the first distance partition $<D^{(t)}>_A$ to obtain a first index partition $<C^{(t)}>_A$ of a cluster index matrix $C^{(t)}$. The cluster index matrix $C^{(t)}$ represents the clusters c that all the sample objects respectively belong to, and the second index partition $<C^{(t)}>_B$ of the cluster index matrix $C^{(t)}$ is held by the second party B.

Then, the first party A performs a second multi-party secure calculation with the second party B with respect to the second feature matrix XB and the second index partition $<C^{(t)}>_B$ held by the second party B based on the first feature matrix XA and the first index partition $<C^{(t)}>_A$ to obtain an updated first centroid partition $<\mu^{(t)}>_A$ in the current round of iterations. An updated second centroid partition $<\mu^{(t)}>_B$ is held by the second party B.

Subsequently, if the first party A and the second party B determine that a predetermined iteration stop condition is currently satisfied, the first party A and the second party B can determine the centroid of each cluster based on the updated first centroid partition $<\mu^{(t)}>_A$ and the updated second centroid partition $<\mu^{(t)}>_B$, and/or determine the cluster that each sample object belongs to based on the first index partition $<C^{(t)}>_A$.

Figure 2B:
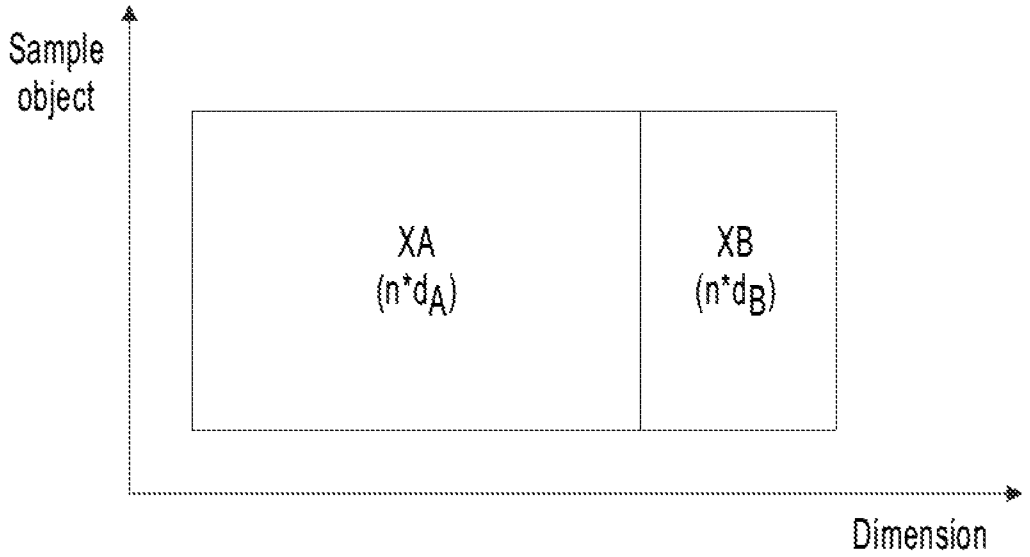
FIG. 2B and FIG. 2C are schematic diagrams illustrating data distribution of a first feature matrix XA and a second feature matrix XB, according to some embodiments.

In some embodiments, the first party A and the second party B respectively hold the first feature matrix XA and the second feature matrix XB, which can be data in any distribution form. In some implementations, the first feature matrix XA and the second feature matrix XB are data in the form of vertical partition, i.e., the first party A and the second party B have different features of the same sample object. To be specific, the first feature matrix XA is a matrix formed by a first portion of features of all sample objects, and a dimension can be expressed as $n*d_A$. The second feature matrix XB is a matrix formed by a second portion of the features of all the sample objects, and a dimension can be expressed as $n*d_B$. Correspondingly, a dimension of an overall feature matrix of all the sample objects to be clustered is expressed as n*d, and $d_A+d_B=d$, where n represents a total quantity of all the sample objects, $d_A$ represents a quantity of the dimensions of the first portion of the features (i.e., the features of the first feature matrix XA), $d_B$ represents a quantity of the dimensions of the second portion of the features (i.e., the features of the first feature matrix XB), and d represents a quantity of dimensions of the features in the overall feature matrix. Correspondingly, FIG. 2B is a schematic diagram illustrating data distribution of the first feature matrix XA and the second feature matrix XB in the form of vertical partition.

For example, in some example scenarios, the first party A and the second party B are an electronic payment platform and a bank institution, respectively, and both parties need to jointly determine which users have similarities, i.e., need to cluster the users. Each of the two parties can maintain one portion of the feature data of the user. For example, the electronic payment platform maintains the electronic payment and transfer related features of the user to form the first feature matrix XA, and the bank institution maintains the credit record related features of the user to form the second feature matrix XB.

In some other examples, the first party A and the second party B are an e-commerce platform and an electronic payment platform, respectively, and both parties need to jointly determine which merchants have similarities, i.e., need to cluster users. Each of the two parties can maintain one portion of the feature data of the merchant. For example, the e-commerce platform stores the sales data of the sample merchant as one portion of the sample feature, and the portion of the sample feature forms the first feature matrix XA. The electronic payment platform maintains the transaction data of the merchant as the other part of the sample feature to form the second feature matrix XB.

In some other example scenarios, the sample objects can alternatively be other objects to be clustered, such as products, interactive events (e.g., transaction events, login events, click events, and purchase events), etc. Correspondingly, the participants can be different service parties maintaining different portions of features of the service object.

Figure 2C:
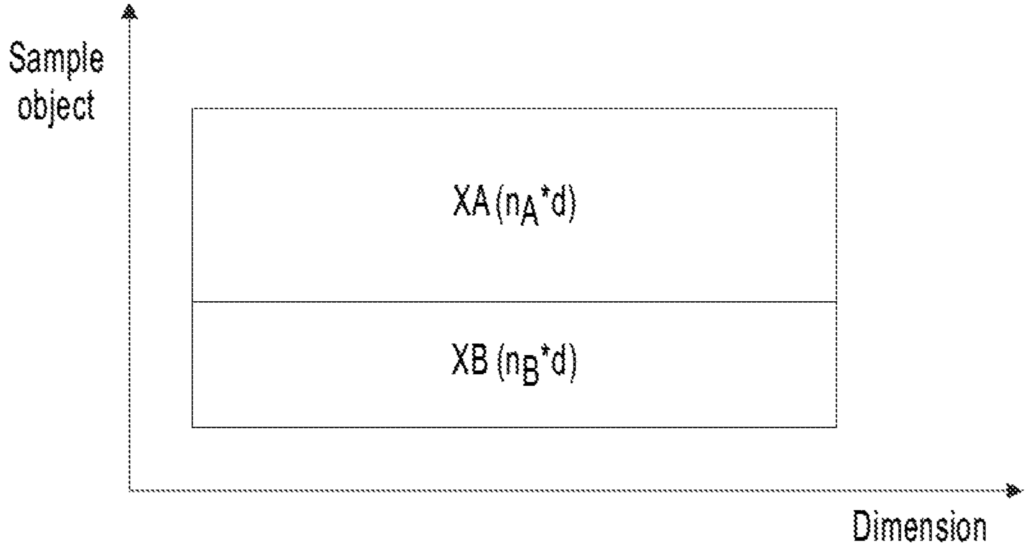

In some other implementations, the first feature matrix XA and the second feature matrix XB are data in the form of horizontal partition, i.e., the first party A and the second party B have different sample objects, but each sample object corresponds to the same feature dimension. To be specific, the first feature matrix XA is a matrix of all the features of the first portion of all the sample objects, and the dimension can be expressed as $n_A$*d. The second feature matrix XB is a matrix of all the features of the second portion of all the sample objects, and the dimension can be expressed as $n_B$*d. Correspondingly, the dimension of the overall feature matrix of all the sample objects to be clustered is expressed as n*d, and $n_A+n_B=n$, where n represents the total quantity of all the sample objects, $n_A$ represents the quantity of the first portion of the sample objects, n B represents the quantity of the second portion of the sample objects, and d represents the quantity of dimensions of the features in the overall feature matrix (i.e., the first feature matrix XA and the second feature matrix XB). Correspondingly, FIG. 2C is a schematic diagram illustrating data distribution of the first feature matrix XA and the second feature matrix XB in the form of horizontal partition.

For example, in some example scenarios, the first party A and the second party B are two bank institutions, respectively, and both parties need to jointly determine which users have similarities, i.e., need to cluster the users. Each of the two parties can maintain feature data of some users. For example, the bank institution A maintains credit record related features of first-type users to form the first feature matrix XA. The bank institution B maintains credit record related features of second-type users to form the second feature matrix XB.

In some other examples, the first party A and the second party B are two e-commerce platforms, respectively, and both parties need to jointly determine which merchants have similarities, i.e., need to cluster users. Each of the two parties can maintain feature data of some merchants. For example, the e-commerce platform A stores the sales data of the first-type sample merchant as one portion of the sample feature, and the portion of the sample feature forms the first feature matrix XA. The e-commerce platform B stores the sales data of the second-type sample merchant as one portion of the sample feature to form the second feature matrix XB.

In some other implementations, the first feature matrix XA and the second feature matrix XB are data in the form of original feature partitions, that is, both the first party A and the second party B have partitions of features of all dimensions of different sample objects. To be specific, the first feature matrix XA is a matrix of first feature partitions of all features in all the sample objects, and the dimension can be expressed as n*d. The second feature matrix XB is a matrix of second feature partitions of all features in all the sample objects, and the dimension can be expressed as n*d. In addition, the dimension of the overall feature matrix of all the sample objects to be clustered is also n*d, where n represents the total quantity of all the sample objects, and d represents the quantity of dimensions of the features in the overall feature matrix (that is, the first feature matrix XA and the second feature matrix XB).

It should be understood that the feature matrices maintained by both parties are private data, and cannot be exchanged in the form of plaintext during joint data clustering so as to protect the security of the private data.

In the above-mentioned process, a multi-party secure calculation is performed between the first party and the second party to perform data clustering while protecting the private data of both parties. In addition, in the distance calculation process, the first multi-party secure calculation is a calculation based on secure matrix multiplication so that the distance matrix representing the distances between all the sample objects and the current centroids of the clusters is obtained by performing the matrix secure calculation once, thereby reducing the calculation amount and the communication traffic in the clustering process and improving the data clustering efficiency.

The following describes in detail the privacy-preserving multi-party joint data clustering method provided in this specification with reference to some specific embodiments.

The privacy-preserving multi-party joint data clustering method involves a first party A and a second party B. The first party A holds the first feature matrix XA, the second party B holds the second feature matrix XB, and the first feature matrix XA and the second feature matrix XB are used to form the overall feature matrix $\chi$ of all sample objects to be clustered. The first feature matrix XA and the second feature matrix XB can be data in any distribution form. When the first feature matrix XA and the second feature matrix XB are data in the form of vertical partition, the overall feature matrix can be expressed as $\chi$=[XA, XB], and the overall feature matrix is obtained by horizontal concatenation of the first feature matrix XA and the second feature matrix XB. When the first feature matrix XA and the second feature matrix XB are data in the form of horizontal partition, the overall feature matrix can be expressed as $$\chi = \begin{bmatrix} XA \\ XB \end{bmatrix},$$

and the overall feature matrix is obtained by vertical concatenation of the first feature matrix XA and the second feature matrix XB. When the first feature matrix XA and the second feature matrix XB are data in the form of original feature partitions, the overall feature matrix can be expressed as $\chi$=[XA+XB].

To perform multi-party joint data clustering while protecting data privacy, an initial preparation stage is first carried out between the first party (i.e., the above-mentioned participant A) and the second party (i.e., the above-mentioned participant B) to prepare for a subsequent data clustering process.

At the initial preparation stage, first, the first party A and the second party B can perform data alignment. When the data held by the first party A and the second party B is data in the form of vertical partition, the first party A and the second party B can pre-negotiate the arrangement order of all the sample objects in the feature matrices they hold. For example, the feature in the $i^{th}$ row of each of the first feature matrix XA and the second feature matrix XB is the feature of the $i^{th}$ sample object, i.e., the feature vector of the $i^{th}$ sample object. When the data held by the first party A and the second party B is data in the form of horizontal partition, the first party A and the second party B can pre-negotiate the arrangement order of features in the feature matrices they hold. For example, the feature in the $l^{th}$ column of each of the first feature matrix XA and the second feature matrix XB is the $l^{th}$ features of all the sample objects.

Then, the first party A and the second party B perform centroid initialization. Correspondingly, the initial centroid matrix (i.e., the current centroid matrix $\mu^{(0)}$ of the first round of iterations in the subsequent multi-round iteration process) can be jointly determined first. The first party A holds one partition of the initial centroid matrix $\mu^{(0)}$ and the second party B holds the other partition of the initial centroid matrix $\mu^{(0)}$.

For example, the method for jointly determining the initial centroid matrix can be as follows: The first party A and the second party B perform a secure calculation based on the first feature matrix XA and the second feature matrix XB they hold respectively to obtain two partitions of the initial centroid matrix, which are held by the first party A and the second party B, respectively. The initial centroid matrix includes feature vectors of k sample objects randomly selected based on the first feature matrix XA and the second feature matrix XB. In some other examples, each of the first party A and the second party B performs local k-means clustering based on the feature matrix X it holds (i.e., based on the first feature matrix XA for the first party A or based on the second feature matrix XB for the second party B) to obtain a clustering result of each party. Further, the first party A and the second party B obtain two partitions of the k initial centroids based on the respective clustering results to respectively form two partitions of the initial centroid matrix.

Each of the first party A and the second party B obtains one partition of the initial centroid matrix, that is, the first party A and the second party B obtain a first centroid partition $<\mu^{(0)}>_A$ and a second centroid partition $<\mu^{(0)}>_B$ of the initial centroid matrix $\mu^{(0)}$, respectively. Then, an update and iteration stage of the centroid can be entered. The initial centroid matrix $\mu^{(0)}$ is the current centroid matrix $\mu^{(0)}$ of the first round of iterations at the update and iteration stage of the centroid. The following some embodiments are described from the perspective of the first party A. For the actions to be performed by the second party B, references can be made to the actions performed by the first party A.

Figure 3:
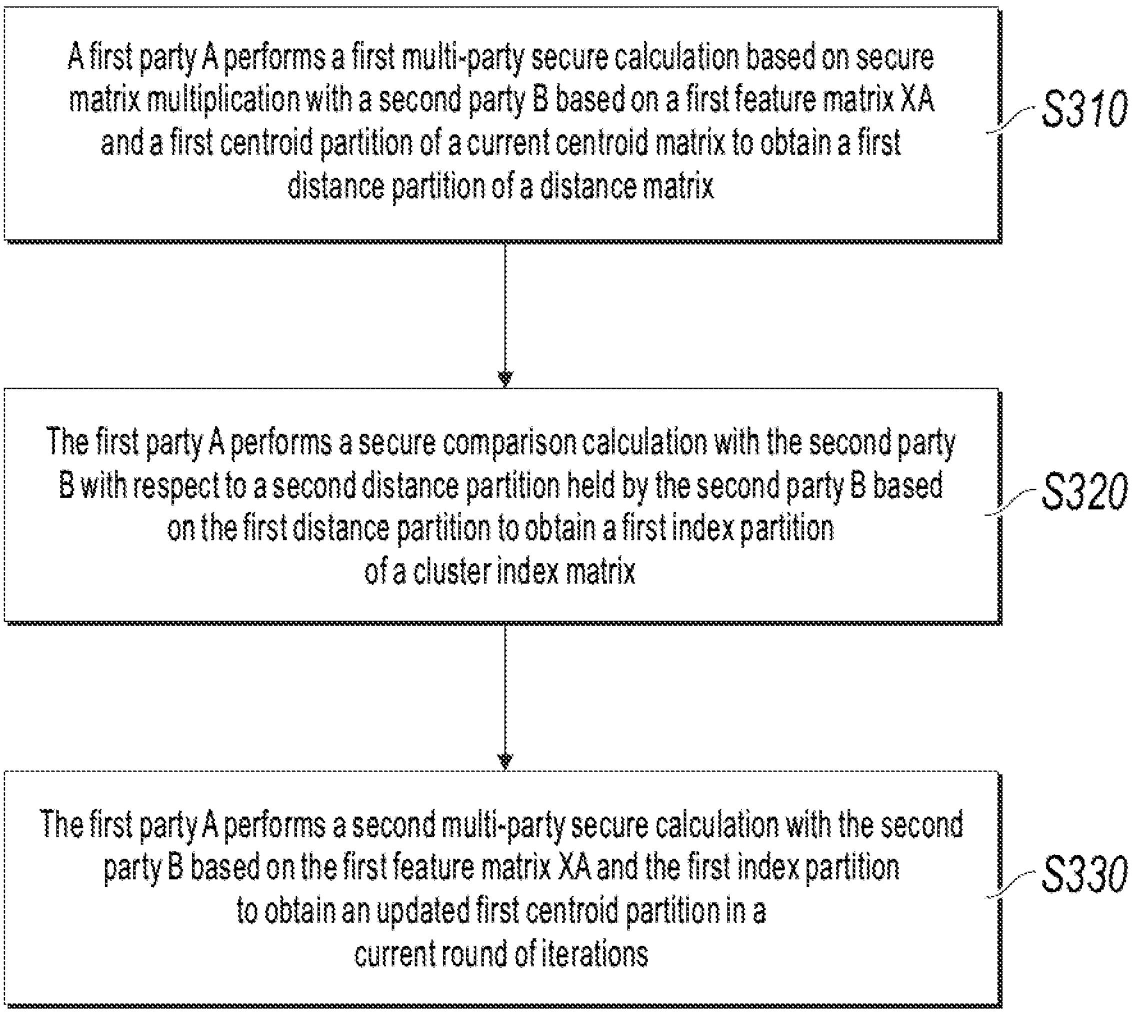
FIG. 3 is a schematic flowchart illustrating a privacy-preserving multi-party joint data clustering method, according to some embodiments.

Specifically, the update and iteration process of the centroid includes a plurality of rounds of iterations. As shown in FIG. 3, in each round of iterations (e.g., the $t^{th}$ round), first, in step S310, the first party A performs a first multi-party secure calculation based on secure matrix multiplication with the second party B based on the first feature matrix XA and the first centroid partition $<\mu^{(t-1)}>_A$ of the current centroid matrix $\mu^{(t-1)}$ to obtain a first distance partition $<D^{(t)}>_A$ of a distance matrix $D^{(t)}$. The distance matrix $D^{(t)}$ represents distances between all sample objects and current centroids of clusters c, and a second distance partition $<D^{(t)}>_B$ of the distance matrix $D^{(t)}$ is held by the second party B.

Specifically, in this step, the first party A performs the first multi-party secure calculation with the second party B with respect to the second feature matrix XB and the second centroid partition $<\mu^{(t-1)}>_B$ of the current centroid matrix $\mu^{(t-1)}$ held by the second party B based on the first feature matrix XA and the first centroid partition $<\mu^{(t-1)}>_A$ of the current centroid matrix $\mu^{(t-1)}$ to obtain the first distance partition $<D^{(t)}>_A$ of the distance matrix $D^{(t)}$ and obtain the second distance partition $<D^{(t)}>_B$ held by the second party B. The distance matrix $D^{(t)}$ represents the distances between all the sample objects and the current centroids of the clusters c. The distance matrix $D^{(t)}$, the first distance partition $<D^{(t)}>_A$, and the second distance partition $<D^{(t)}>_B$ are all n*k matrices, where n represents a total quantity of all the sample objects and k represents a quantity of centroids (i.e., clusters). Distance matrix $D^{(t)}=<D^{(t)}>_A+<D^{(t)}>_B$.

In some cases, a distance $$D_{ij}^{(t)}$$

between the $i^{th}$ sample object $\chi_i$ and the $j^{th}$ centroid $$u_j^{(t-1)}$$

in the current centroid matrix can be expressed by the following formula (1):

$$D_{ij}^{(t)} = \mathcal{F}_{ESD}(\chi_i, u_j^{(t-1)}) = \sum_{l=1}^{d} \chi_{il}^2 + \sum_{l=1}^{d} u_{jl}^{(t)^2} - 2\chi_{il}u_{jl}^{(t)}; \quad (1)$$

In the formula, d represents a quantity of dimensions of all features of the $i^{th}$ sample object, $\chi_{il}$ represents the $l^{th}$ feature of the $i^{th}$ sample object, and $\mu^{(t)}{}_{jl}$ represents the $l^{th}$ feature of the $j^{th}$ centroid in the current centroid matrix in the $t^{th}$ round of iterations.

Correspondingly, the distance matrix can be expressed by the following formula (2):

$$D^{(t)} = \chi^2 + \mu^{(t-1)^2} - 2\chi\mu^{(t-1)^T}; \quad (2)$$

It can be understood that when i remains unchanged, $$\sum_{l=1}^{d} \chi_{il}^2$$

remains unchanged, that is, for the distance between the $i^{th}$ sample object and each centroid, $$\sum_{l=1}^{d} \chi_{il}^2$$

is the same. Correspondingly, when the distance between the $i^{th}$ sample object and the $j^{th}$ centroid is calculated, $$\sum_{l=1}^{d} \chi_{il}^2$$

can be omitted. Further, when the distance matrix $D^{(t)}$ is calculated, calculation of $$\sum_{l=1}^{d} \chi_{il}^2$$

corresponding to each sample object can be omitted.

Correspondingly, in a subsequent distance matrix calculation process, $D'^{(t)}=\mu^{(t-1)^2}-2\chi\mu^{(t-1)^T}$ (3) is calculated.

Next, the above-mentioned formula (2) can be transformed into:

$$D'^{(t)} = \langle U \rangle - 2\chi\mu^{(t-1)^T} = \langle U \rangle - 2\chi\left[\langle \mu^{(t-1)} \rangle_A + \langle \mu^{(t-1)} \rangle_B\right]^T; \quad (4)$$

In the formula, $<U>=\mu^{(t-1)^2}$ and $\mu^{(t-1)}=<\mu^{(t-1)}>_A+<\mu^{(t-1)}>_B$.

It can be understood that when the first feature matrix XA and the second feature matrix XB are data in the form of vertical partition, the first feature matrix XA is a matrix formed by a first portion of features of all the sample objects, and the dimension is $n*d_A$. The second feature matrix XB] is a matrix formed by a second portion of features of all the sample objects, and the dimension is $n*d_B$. Correspondingly, the overall feature matrix can be expressed as $\chi=[XA, XB]$. The current centroid matrix $\mu^{(t-1)}$ includes a first submatrix $$\mu_A^{(t-1)}$$

(the dimension is $k*d_A$) corresponding to the first portion of features and a second submatrix $$\mu_B^{(t-1)}$$

(the dimension is $k*d_B$) corresponding to the second portion of features. The first centroid partition $<\mu^{(t-1)}>_A$ includes a first-party partition $<\mu^{(t-1)}>_{A1}$ (the dimension is $k*d_A$) of the first submatrix and a first-party partition $<\mu^{(t-1)}>_{A2}$ (the dimension is $k*d_B$) of the second submatrix, which are held by the first party A. The second centroid partition $<\mu^{(t-1)}>_B$ includes a second-party partition $<\mu^{(t-1)}>_{B1}$ (the dimension is $k*d_A$) of the first submatrix and a second-party partition $<\mu^{(t-1)}>_{B2}$ (the dimension is $k*d_B$) of the second submatrix, which are held by the second party B.

Here, $$\mu^{(t-1)} = \left[\mu_A^{(t-1)}, \mu_B^{(t-1)}\right], \mu_A^{(t-1)} = \langle\mu^{(t-1)}\rangle_{A1} + \langle\mu^{(t-1)}\rangle_{B1};$$
$$\mu_B^{(t-1)} = \langle\mu^{(t-1)}\rangle_{A2} + \langle\mu^{(t-1)}\rangle_{B2}.$$

Correspondingly, formula (4) can be transformed into:

$$D'^{(t)} = \langle U\rangle - 2\chi\mu^{(t-1)^T} = \langle U\rangle - 2[XA, XB]\left[\langle\mu^{(t-1)}\rangle_A + \langle\mu^{(t-1)}\rangle_B\right]^T = \langle U\rangle - 2\left[XA\left(\langle\mu^{(t-1)}\rangle_{A1} + \langle\mu^{(t-1)}\rangle_{B1}\right)^T, XB\left(\langle\mu^{(t-1)}\rangle_{A2} + \langle\mu^{(t-1)}\rangle_{B2}\right)^T\right]; \tag{5}$$

When the first feature matrix XA and the second feature matrix XB are data in the form of horizontal partition, the overall feature matrix can be expressed as $$\chi = \begin{bmatrix} XA \\ XB \end{bmatrix}.$$

The first feature matrix XA is a matrix of all features of the first portion of all the sample objects, and the dimension is $n_A*d$. The second feature matrix XB is a matrix of all features of the second portion of all the sample objects, and the dimension is $n_B*d$. Each of the current centroid matrix $\mu^{(t-1)}$, the first centroid partition $<\mu^{(t-1)}>_A$, and the second centroid partition $<\mu^{(t-1)}>_B$ has k*d dimensions, where d represents a dimension of all the features and k represents a predetermined cluster number. Here $\mu^{(t-1)}=<\mu^{(t-1)}>_A+<\mu^{(t-1)}>_B$.

Correspondingly, formula (4) can be transformed into:

$$D'^{(t)} = <U> - 2\chi\mu^{(t-1)^T} = <U> - 2\begin{bmatrix} XA \\ XB \end{bmatrix}\left(<\mu^{(t-1)}>_A^T + <\mu^{(t-1)}>_B^T\right) = <U> - 2\begin{bmatrix} XA\left(<\mu^{(t-1)}>_A^T + <\mu^{(t-1)}>_B^T\right) \\ XB\left(<\mu^{(t-1)}>_A^T + <\mu^{(t-1)}>_B^T\right) \end{bmatrix}; \tag{6}$$

When the first feature matrix XA and the second feature matrix XB are data in the form of original feature partitions, the overall feature matrix can be expressed as $\chi=[XA+XB]$. Correspondingly, formula (4) can be transformed into:

$$D'^{(t)} = \langle U\rangle - 2\chi\mu^{(t-1)^T} = \langle U\rangle - 2[XA, XB]\left[\langle\mu^{(t-1)}\rangle_A + \langle\mu^{(t-1)}\rangle_B\right]^T = \langle U\rangle - 2\left[XA\left(\langle\mu^{(t-1)}\rangle_{A1} + \langle\mu^{(t-1)}\rangle_{B1}\right)^T + XB\left(\langle\mu^{(t-1)}\rangle_{A2} + \langle\mu^{(t-1)}\rangle_{B2}\right)^T\right]; \tag{7}$$

Correspondingly, in some embodiments, the first multi-party secure calculation includes the following steps:

In step 11, the first party A performs a secure calculation including secure matrix multiplication based on the first centroid partition $<\mu^{(t-1)}>_A$ and the second centroid partition $<\mu^{(t-1)}>_B$ held by the second party B to determine a first intermediate result $Z_1$.

In step 12, the first party A performs a local computation based on the first feature matrix XA and the first centroid partition $<\mu^{(t-1)}>_A$ to determine a second intermediate result $Z_2$.

In step 13, the first party A performs secure matrix multiplication based on the first feature matrix XA and the second centroid partition $<\mu^{(t-1)}>_B$ held by the second party B to determine a third intermediate result $Z_3$.

In step 14, the first party A performs secure matrix multiplication based on the first centroid partition $<\mu^{(t-1)}>_A$ and the second feature matrix XB held by the second party B to determine a fourth intermediate result $Z_4$.

In step 15, the first party A determines the first distance partition $<D^{(t)}>_A$ based on the first intermediate result $Z_1$, the second intermediate result $Z_2$, the third intermediate result $Z_3$, and the fourth intermediate result $Z_4$.

In some implementations, the first party A can first perform a secure calculation including secure matrix multiplication based on the first centroid partition $<\mu^{(t-1)}>_A$ and the second centroid partition $<\mu^{(t-1)}>_B$ held by the second party B to determine the first intermediate result $Z_1$ (that is, one partition, held by the first party A, of the above-mentioned <U>).

$$\langle U\rangle = \left(\langle\mu^{(t-1)}\rangle_A + \langle\mu^{(t-1)}\rangle_B\right)^2 = \left(\langle\mu^{(t-1)}\rangle_A\right)^2 + \left(\langle\mu^{(t-1)}\rangle_B\right)^2 + 2\langle\mu^{(t-1)}\rangle_A * \langle\mu^{(t-1)}\rangle_B; \tag{8}$$

It can be understood from formula (8) that, $<\mu^{(t-1)}>_A$ is held by the first party A and $(<\mu^{(t-1)}>_A)^2$ can be calculated locally by the first party A. $<\mu^{(t-1)}>_B$ is held by the second party B and $(<\mu^{(t-1)}>_B)^2$ can be calculated locally by the second party B. For $<\mu^{(t-1)}>_A*<\mu^{(t-1)}>_B$ the first party A can perform secure matrix multiplication based on $<\mu^{(t-1)}>_A$ and $<\mu^{(t-1)}>_B$ held by the second party B so that the first party A obtains one partition $<a>_A$ of $<\mu^{(t-1)}>_A*<\mu^{(t-1)}>_B$ and the second party B obtains the other partition $<a>_B$ of $<\mu^{(t-1)}>_A*<\mu^{(t-1)}>_B$.

Next, the first party A obtains the first intermediate result $Z_1$ (i.e., one partition, held by the first party A, of $\langle U \rangle$) based on the calculated $(\langle \mu^{(t-1)} \rangle_A)^2$ and partition $\langle a \rangle_A$. The second party B obtains the other partition of $\langle U \rangle$, which can be referred to as a fifth intermediate result $Z_5$, based on the calculated $(\langle \mu^{(t-1)} \rangle_B)^2$ and partition $\langle a \rangle_B$.

Then, since both the first feature matrix XA and the first centroid partition $\langle \mu^{(t-1)} \rangle_A$ are held by the first party A, the first party A performs a local computation based on the first feature matrix XA and the first centroid partition $\langle \mu^{(t-1)} \rangle_A$ to determine the second intermediate result $Z_2$.

Similarly, on the second party B side, since both the second feature matrix XB and the second centroid partition $\langle \mu^{(t-1)} \rangle_B$ are held by the second party B, the second party B performs a local computation based on the second feature matrix XB and the second centroid partition $\langle \mu^{(t-1)} \rangle_B$ to determine a sixth intermediate result $Z_6$.

It can be understood from the above-mentioned formulas (5), (6) and (7) that, to calculate the first distance partition $\langle D^{(t)} \rangle_A$ and the second distance partition $\langle D^{(t)} \rangle_B$ of the distance matrix $D^{(t)}$, the first party A further needs to perform secure matrix multiplication based on the first feature matrix XA it holds and the second centroid partition $\langle \mu^{(t-1)} \rangle_B$ held by the second party B to determine the third intermediate result $Z_3$, that is, one partition of $$XA\langle \mu^{(t-1)} \rangle_B^T.$$

In addition, the second party B obtains the other partition of $$XA\langle \mu^{(t-1)} \rangle_B^T,$$

which can be referred to as a seventh intermediate result $Z_7$.

The first party A further needs to perform secure matrix multiplication based on the first centroid partition $\langle \mu^{(t-1)} \rangle_A$ it holds and the second feature matrix XB held by the second party B to determine the fourth intermediate result $Z_4$, that is, one partition of $$XB\langle \mu^{(t-1)} \rangle_A^T.$$

addition, the second party B obtains the other partition of $$XB\langle \mu^{(t-1)} \rangle_A^T,$$

which can be referred to as an eighth intermediate result $Z_8$.

Next, the first party A obtains the first distance partition $\langle D^{(t)} \rangle_A$ (which is actually $\langle D'^{(t)} \rangle_A$) based on the first intermediate result $Z_1$, the second intermediate result $Z_2$, the third intermediate result $Z_3$, and the fourth intermediate result $Z_4$.

Correspondingly, the second party B obtains the second distance partition $\langle D^{(t)} \rangle_B$ (which is actually $\langle D'^{(t)} \rangle_B$) based on the fifth intermediate result $Z_5$, the sixth intermediate result $Z_6$, the seventh intermediate result $Z_7$, and the eighth intermediate result $Z_8$.

In still some other embodiments, the first feature matrix XA and the second feature matrix XB are data in the form of vertical partition. It can be understood from the above-mentioned formula (5) that, in step 13, the first party A can perform secure matrix multiplication based on the first feature matrix XA and the second-party partition $\langle \mu^{(t-1)} \rangle_{B1}$ of the first submatrix held by the second party B to obtain the third intermediate result $Z_3$ (i.e., one partition of $$XA * \langle \mu^{(t-1)} \rangle_{B1}^T;$$

the other partition of $$XA * \langle \mu^{(t-1)} \rangle_{B1}^T$$

is held by the second party B).

In step 14, the first party A performs secure matrix multiplication based on the first-party partition $\langle \mu^{(t-1)} \rangle_{A2}$ of the second submatrix and the second feature matrix XB held by the second party B to obtain the fourth intermediate result $Z_4$ (i.e., one partition of $$XB * \langle \mu^{(t-1)} \rangle_{A2}^T;$$

the other partition of $$XB * \langle \mu^{(t-1)} \rangle_{A2}^T$$

is held by the second party B).

In some embodiments, the secure matrix multiplication can be a general matrix multiplication based on a secret sharing protocol or can be a sparse matrix multiplication based on a homomorphic encryption protocol and a secret sharing protocol.

In some implementations, when the secure matrix multiplication is a general matrix multiplication based on a secret sharing protocol, the first party A and the second party B need to generate multiplication triples respectively for their matrices (e.g., the first feature matrix XA and the second-party partition $\langle \mu^{(t-1)} \rangle_{B1}$ of the first submatrix) participating in the general matrix multiplication. It can be understood that, in cases where the sample objects are determined, and the first feature matrix XA and the second feature matrix XB are determined, correspondingly, the first party A can determine the multiplication triple of the first feature matrix XA in advance offline, and the second party B can also determine the multiplication triple of the second feature matrix XB in advance offline. Then, when the secure calculation is performed through the general matrix multiplication based on the secret sharing protocol, the corresponding multiplication triple can be directly read to shorten the time consumed at the online stage of the data clustering process to some extent.

In some implementations, when the secure matrix multiplication is a sparse matrix multiplication based on a homomorphic encryption protocol and a secret sharing protocol, step 13 is specifically configured as follows: In step 131, the first party A obtains a second centroid partition ciphertext $[\langle \mu^{(t-1)} \rangle_B]_{PK}$, where the second centroid partition ciphertext $[\langle \mu^{(t-1)} \rangle_B]_{PK}$ is obtained by the second party B by performing homomorphic encryption on the second centroid partition $\langle \mu^{(t-1)} \rangle_B$ by using the first target public key PK1. The first target public key PK1 is generated by the second party B based on the homomorphic encryption protocol, and the second party B further privately holds the first target private key SK1 corresponding to the first target public key PK1. The second party B acts as a data encryption party in the process of a sparse matrix multiplication.

In step 132, the first party A calculates a product $[<\mu^{(t-1)}>_N]_{PK1}$ of the first feature matrix XA and the second centroid partition ciphertext to obtain the first product ciphertext. The first product ciphertext can be expressed as $[Z]_{PK1}=XA*[<\mu^{(t-1)}>_B]_{PK1}$. Based on the homomorphism of the homomorphic encryption algorithm in the homomorphic encryption protocol, $[Z]_{PK1}=XA*[<\mu^{(t-1)}>_B]_{PK1}=[XA*<\mu^{(t-1)}>_B]_{PK1}$.

In step 133, the first party A generates a first random matrix $S_1$ as a first result partition of the first product ciphertext $[Z]_{PK1}$, and uses the first result partition as the third intermediate result $Z_3$. It can be understood that the first random matrix $S_1$ belongs to a data domain $\phi$ of the second execution partition ciphertext. When the first target public key PK1 and the first target private key SK2 are definite, the data domain $\phi$ is definite.

In step 134, the first party A determines a second result partition ciphertext $[S_2]_{PK1}$ of the first product ciphertext $[Z]_{PK1}$ based on the first product ciphertext $[Z]_{PK1}$ and the first random matrix $S_1$, and sends the second result partition ciphertext $[S_2]_{PK1}$ to the second party B so that the second party B decrypts the second result partition ciphertext $[S_2]_{PK}$ to obtain a second result partition $S_2$ as a second-party B intermediate result corresponding to the third intermediate result $Z_3$.

Specifically, the process of determining the second result partition ciphertext $[S_2]_{PK1}$ by the first party A can be expressed by the following formula (9):

$$[S_2]_{PK1}=([Z]_{PK1}-S_1)\text{mod }\phi; \quad (9)$$

After obtaining the second result partition ciphertext $[S_2]_{PK1}$, the first party A sends the second result partition ciphertext $[S_2]_{PK1}$ to the second party B. The second party B decrypts the second result partition ciphertext $[S_2]_{PK1}$ by using the first target private key SK1 to obtain the second result partition $S_2$, that is, the above-mentioned seventh intermediate result $Z_7$. As such, the first party A performs a sparse matrix multiplication with the second party B so that the first party A obtains the above-mentioned third intermediate result $Z_3$ and the second party B obtains the above-mentioned seventh intermediate result $Z_7$.

In still some other implementations, when the secure matrix multiplication is a sparse matrix multiplication based on a homomorphic encryption protocol and a secret sharing protocol, the first party A acts as a data encryption party in the process of a sparse matrix multiplication. Specifically, step 13 can be further configured as follows: In step 135, the first party A encrypts the first feature matrix XA by using the second target public key PK2 to obtain a first matrix ciphertext $[XA]_{PK2}$ and sends the first matrix ciphertext $[XA]_{PK2}$ to the second party B. The second target public key PK2 is generated by the first party A based on the homomorphic encryption protocol, and the first party A further privately holds the second target private key SK2 corresponding to the second target public key PK2.

In step 136, the first party A receives a third result partition ciphertext $[S_3]_{PK2}$ from the second party B, decrypts the third result partition ciphertext to obtain a third result partition plaintext $S_3$ as the third intermediate result $Z_3$. The third result partition ciphertext $[S_3]_{PK2}$ is determined by the second party B based on the second product ciphertext $[Z]_{PK2}$ and the second random matrix $S_3$ generated by the second party B. The second product ciphertext $[Z]_{PK2}$ is a product result of the first matrix ciphertext $[XA]_{PK2}$ and the second centroid partition $<\mu^{(t-1)}>_B$ held by the second party B. The second random matrix $S_3$ is used as the second party B intermediate result, held by the second party B, corresponding to the third intermediate result $Z_3$, that is, the above-mentioned seventh intermediate result $Z_7$.

For the process of determining the third result partition ciphertext $[S_3]_{PK2}$, references can be made to the above-mentioned formula (8), and details are omitted for simplicity. After obtaining the third result partition ciphertext $[S_3]_{PK2}$, the first party A decrypts the third result partition ciphertext by using the second target private key SK2 it privately holds to obtain the third result partition plaintext $S_3$, that is, to obtain the third intermediate result $Z_3$.

Then, the first party A obtains a first distance partition $<D^{(t)}>_A$ of a distance matrix $D^{(t)}$, and the second party B obtains a second distance partition $<D^{(t)}>_B$ of the distance matrix $D^{(t)}$. Then, in step S320, the first party A performs a secure comparison calculation with the second party B with respect to the second distance partition $<D^{(t)}>_B$ held by the second party B based on the first distance partition $<D^{(t)}>_A$ to obtain a first index partition $<C^{(t)}>_A$ of a cluster index matrix $C^{(t)}$. The cluster index matrix $C^{(t)}$ represents clusters c that all sample objects respectively belong to, and a second index partition $<C^{(t)}>_B$ of the cluster index matrix $C^{(t)}$ is held by the second party B.

In some implementations, for any sample object, the first party A can perform a secure comparison calculation for distances (two distance value partitions corresponding to clusters) corresponding to any two clusters with the second party B with respect to k distance value partitions corresponding to the sample object in the second distance partition $<D^{(t)}>_B$ held by the second party B based on k distance value partitions (distance value partitions corresponding to k centroids) corresponding to the sample object in the first distance partition $<D^{(t)}>_A$ so as to obtain a comparison result and obtain partitions of index values (i.e., index value partitions) corresponding to the two compared clusters. A secure comparison calculation is performed on two distance value partitions, represented by the obtained comparison result, corresponding to the cluster with a shorter centroid distance from the sample object, and two distance value partitions corresponding to any cluster not currently compared so as to obtain partitions of index values (i.e., index value partitions) corresponding to the two compared clusters, respectively. In this way, a partition of an index vector corresponding to the sample object is obtained.

For example, six clusters, i.e., six centroids are included. For sample object M, the first party A can perform a secure comparison calculation for two distance value partitions corresponding to cluster 1 and two distance value partitions corresponding to cluster 2 with the second party B with respect to six distance value partitions corresponding to the sample object M in the second distance partition $<D^{(t)}>_B$ held by the second party B based on six distance value partitions (distance value partitions corresponding to six centroids) corresponding to the sample object M in the first distance partition $<D^{(t)}>_A$ so as to obtain a comparison result 1 and obtain partitions of index values (i.e., index value partitions) corresponding to cluster 1 and cluster 2, respectively. A secure comparison calculation is performed on two distance value partitions, represented by the comparison result 1, corresponding to the cluster (e.g., cluster 1; in such case, two partitions with two index value partitions 1 corresponding to cluster 1 and two partitions with two index value partitions 0 corresponding to cluster 2) with a shorter centroid distance from the sample object M, and two distance value partitions corresponding to any cluster (i.e., any one of clusters 3 to 6, for example, cluster 3) not currently compared so as to obtain a comparison result 2 and obtain index value partitions corresponding to cluster 2 and cluster 3, respectively. A secure comparison calculation is performed on two distance value partitions, represented by the comparison result 2, corresponding to the cluster (e.g., cluster 2; in such case, two partitions with two index value partitions being not 1 corresponding to cluster 2 and two partitions with two index value partitions 0 corresponding to cluster 3) with a shorter centroid distance from the sample object M, and two distance value partitions corresponding to any cluster (i.e., any one of clusters 4 to 6, for example, cluster 4) not currently compared so as to obtain a comparison result 3. In this way, a partition of an index vector corresponding to the sample object M is obtained.

Then, the first index partition $<C^{(t)}>_A$ of the cluster index matrix $C^{(t)}$ is obtained by combining the partitions of the index vectors corresponding to all the sample objects. Similarly, the second party B can obtain other partitions of the index vectors corresponding to all the sample objects, and obtain the second index partition $<C^{(t)}>_B$ of the cluster index matrix $C^{(t)}$ by combining the other partitions of the index vectors corresponding to all the sample objects obtained by the second party B.

In some embodiments, to further increase a speed of the data clustering process and improve data clustering efficiency, step S320 is specifically configured as follows: In step 21, the first party A constructs leaf nodes of a binary tree based on a predetermined cluster number k.

In step 22, with respect to two adjacent clusters among clusters indicated by layer nodes of the binary tree for any sample object, the first party A executes a secure comparison algorithm with the second party by using two distance value partitions of the sample object corresponding to the two clusters in the first distance partition $<D^{(t)}>_A$ to obtain a cluster with a closer distance as a next layer node until a root node is reached.

In step 23, the first party A determines the first index partition based on a root node of each sample object.

In some implementations, the first party A constructs the leaf nodes of the binary tree based on the predetermined cluster number k, where k leaf nodes are included, and each leaf node corresponds to one cluster c. The binary tree can include k−1 comparison modules (CMPMs) for executing a secure comparison algorithm for distance value partitions (one cluster corresponds to two distance value partitions, which are respectively held by the first party A and the second party B) corresponding to clusters c indicated by the designated adjacent nodes. It can be understood that the binary tree can alternatively be constructed by the second party B.

With respect to two adjacent clusters among clusters c indicated by layer nodes of the binary tree for any sample object, the first party A executes a secure comparison algorithm by using two distance value partitions of the sample object corresponding to the two clusters in the first distance partition $<D^{(t)}>_A$ and two distance value partitions of the sample object corresponding to the two clusters in the second distance partition $<D^{(t)}>_B$ of the second party to obtain a cluster with a closer distance as a next layer node until a root node is reached, and further determines the first index partition $<C^{(t)}>_A$ based on the root node of each sample object.

Figure 4:
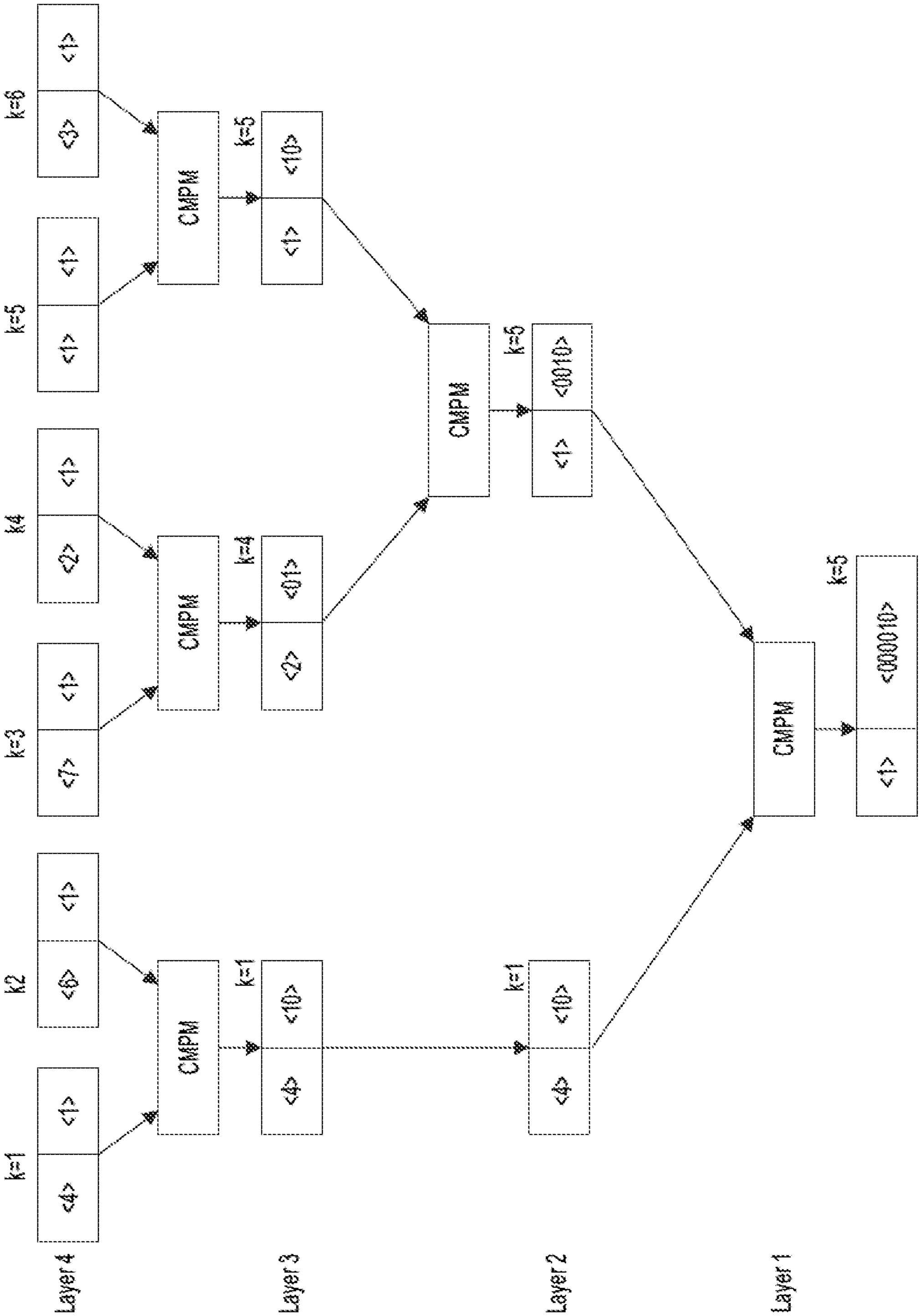
FIG. 4 is a schematic block diagram illustrating a privacy-preserving multi-party joint data clustering apparatus, according to some embodiments.

FIG. 4 is a schematic diagram of a binary tree constructed by the first party A based on a cluster number k (6). Six leaf nodes of the binary tree include four layers of nodes, and the binary tree includes five comparison modules "CMPMs". Each cluster corresponds to one initial index value, that is, each leaf node correspondingly stores one initial index value. As shown in FIG. 4, a right side of each of the six leaf nodes represents a value 1 (the initial index value), and a left side of each of the six leaf nodes correspondingly represents an entry of a distance value partition of the sample object corresponding to a cluster indicated by the leaf nodes in the first distance partition (and in the second distance partition) of the input comparison module.

The example shown in FIG. 4 is merely intended to clearly describe comparison logic of the process of performing the secure comparison calculation by using the binary tree structure. In FIG. 4, each value placed inside the symbols < > represents that the value is in the form of a partition during the calculation. In other words, in such a process, an input of each node of the binary tree is a distance value partition, and each node of the binary tree obtains an index value in the form of a partition, and various partitions are held by the first party A and the second party B, respectively. Correspondingly, for the sample object M, based on the root node of the binary tree, the first party A can obtain one partition of the index vector corresponding to the sample object M. Similarly, the second party B can obtain another partition of the index vector corresponding to the sample object M.

Specifically, as shown in FIG. 4, first, on the first party A side, for any sample object, two adjacent clusters among the clusters indicated by leaf nodes at the fourth layer (i.e., layer 4 in the figure) of the binary tree, that is, clusters 1 and 2 respectively indicated by the first two leaf nodes correspond to one comparison module; clusters 3 and 4 indicated by the middle two leaf nodes correspond to one comparison module; clusters 5 and 6 indicated by the last two leaf nodes correspond to one comparison module.

As shown in FIG. 4, the first party A first executes a secure comparison algorithm (that is, inputs the comparison module CMPM corresponding to the first two nodes at the fourth layer) by using the two distance value partitions of the sample object M corresponding to clusters 1 and 2 in the first distance partition $<D^{(t)}>_A$ and the two distance value partitions of the sample object M corresponding to clusters 1 and 2 in the second distance partition $<D^{(t)}>_B$ of the second party B to obtain a comparison result. Specifically, a distance value between the sample object M and the current centroid corresponding to cluster 1 is smaller than a distance value between the sample object and the current centroid corresponding to cluster 2. Correspondingly, if the comparison module outputs 1 (the left input is small, indicating true), cluster 1 (the corresponding node) corresponds to the initial index value 1*1 and cluster 2 (the corresponding node) corresponds to the initial index value 1*0. Correspondingly, the index vector corresponding to the first node at the third layer (i.e., layer 3 in the figure) of the binary tree is 10, as shown in FIG. 4, and the cluster indicated by the first node at the third layer is cluster 1.

Corresponding to clusters 3 and 4, the first party A executes a secure comparison algorithm (that is, inputs the comparison module CMPM corresponding to the middle two nodes at the fourth layer) by using the two distance value partitions of the sample object M corresponding to clusters 3 and 4 in the first distance partition $<D^{(t)}>_A$ and the two distance value partitions of the sample object M corresponding to clusters 3 and 4 in the second distance partition $<D^{(t)}>_B$ of the second party B to obtain a comparison result. Specifically, a distance value between the sample object M and the current centroid corresponding to cluster 3 is larger than a distance value between the sample object and the current centroid corresponding to cluster 4. Correspondingly, if the comparison module outputs 0 (the left input is large, indicating false), cluster 3 corresponds to the initial index value 1*0 and cluster 4 corresponds to the initial index value 1*1. Correspondingly, the index vector corresponding to the second node at the third layer of the binary tree is 01, as shown in FIG. 4, and the cluster indicated by the second node at the third layer is cluster 4.

Corresponding to clusters 5 and 6, the first party A executes a secure comparison algorithm (that is, inputs the comparison module CMPM corresponding to the last two nodes at the fourth layer) by using the two distance value partitions of the sample object M corresponding to clusters 5 and 6 in the first distance partition $<D^{(t)}>_A$ and the two distance value partitions of the sample object M corresponding to clusters 5 and 6 in the second distance partition $<D^{(t)}>_B$ of the second party B to obtain a comparison result. Specifically, a distance value between the sample object M and the current centroid corresponding to cluster 5 is smaller than a distance value between the sample object and the current centroid corresponding to cluster 6. Correspondingly, if the comparison module outputs 1, cluster 5 corresponds to the initial index value 1*1 and cluster 6 corresponds to the initial index value 1*0. Correspondingly, the index vector corresponding to the third node at the third layer of the binary tree is 10, as shown in FIG. 4, and the cluster indicated by the third node at the third layer is cluster 5.

Next, the last two nodes at the third layer of the binary tree indicate clusters 4 and 5, respectively, corresponding to one comparison module. Corresponding to clusters 4 and 5, the first party A executes a secure comparison algorithm (that is, inputs the comparison module CMPM corresponding to the last two nodes at the third layer) by using the two distance value partitions of the sample object M corresponding to clusters 4 and 5 in the first distance partition $<D^{(t)}>_A$ and the two distance value partitions of the sample object M corresponding to clusters 4 and 5 in the second distance partition $<D^{(t)}>_B$ of the second party B to obtain a comparison result. Specifically, a distance value between the sample object M and the current centroid corresponding to cluster 4 is larger than a distance value between the sample object and the current centroid corresponding to cluster 5. Correspondingly, if the comparison module outputs 0, the index vector of the second node at the third layer is 01*0 and the index vector of the third node at the third layer is 10*0. Correspondingly, the index vector corresponding to the second node at the second layer of the binary tree is 0010, as shown in FIG. 4, and the cluster indicated by the second node at the second layer is cluster 5.

The cluster indicated by the first node at the second layer of the binary tree is equivalent to the cluster indicated by the first node at the third layer 3, which is cluster 1. The two nodes at the second layer correspond to one comparison module. Corresponding to clusters 1 and 5, the first party A executes a secure comparison algorithm (that is, inputs the comparison module CMPM corresponding to the two nodes at the second layer (i.e., layer 2 in the figure)) by using the two distance value partitions of the sample object M corresponding to clusters 1 and 5 in the first distance partition $<D^{(t)}>_A$ and the two distance value partitions of the sample object M corresponding to clusters 1 and 5 in the second distance partition $<D^{(t)}>_B$ of the second party B to obtain a comparison result. Specifically, a distance value between the sample object M and the current centroid corresponding to cluster 1 is larger than a distance value between the sample object and the current centroid corresponding to cluster 5. Correspondingly, if the comparison module outputs 0, the index vector of the first node at the second layer is 10*0 and the index vector of the second node at the second layer is 0010*1. Correspondingly, the index vector corresponding to the node at the first layer of the binary tree is 000010, as shown in FIG. 4, and the cluster indicated by the node at the first layer (i.e., layer 1 in the figure) is cluster 5.

After obtaining the root node of each sample object, that is, one partition of the index vector corresponding to the root node, the first party A can combine the partitions to obtain the first index partition. Similarly, after obtaining the root node of each sample object, that is, the other partition of the index vector corresponding to the root node, the second party B can combine the other partitions to obtain the second index partition.

Then, in step S330, the first party A performs a second multi-party secure calculation with the second party B based on the first feature matrix XA and the first index partition $<C^{(t)}>_A$ to obtain an updated first centroid partition $<\mu^{(t)}>_A$ in the current round of iterations. An updated second centroid partition $<\mu^{(t)}>_B$ is held by the second party B.

In this step, the first party A performs a second multi-party secure calculation with the second party B with respect to the second feature matrix XB and the second index partition $<C^{(t)}>_B$ held by the second party B based on the first feature matrix XA and the first index partition $<C^{(t)}>_A$ to obtain an updated first centroid partition $<\mu^{(t)}>_A$ in the current round of iterations. An updated second centroid partition $<\mu^{(t)}>_B$ is held by the second party B.

It can be understood that the first index partition $<C^{(t)}>_A$ and the second index partition $<C^{(t)}>_B$ can jointly represent the cluster that each sample object belongs to, and further count a quantity of sample objects included in each cluster. To be specific, the first party A can perform a secure calculation based on the first index partition $<C^{(t)}>_A$ and the second index partition $<C^{(t)}>_B$ held by the second party to count the quantity of sample objects belonging to each cluster. In addition, the first party A performs a second multi-party secure calculation with the second party B with respect to the second feature matrix XB and the second index partition $<C^{(t)}>_B$ held by the second party B based on the first feature matrix XA and the first index partition $<C^{(t)}>_A$ to determine a first sum partition of the sum of the feature vectors of the sample objects belonging to all clusters. In addition, a second sum partition of the sum of the feature vectors of the sample objects belonging to all the clusters is held by the second party B. Further, the first party A can perform secure matrix multiplication with the second party B with respect to the second sum partition held by the second party B based on the first sum partition of the sum of the feature vectors of the sample objects belonging to all the clusters and a quantity of the sample objects belonging to all the clusters to obtain the updated first centroid partition $<\mu^{(t)}>_A$ in the current round of iterations. In addition, the first party A obtains the updated second centroid partition $<\mu^{(t)}>_B$, held by the second party B, in the current round of iterations.

In some cases, the process of obtaining an updated centroid matrix in the current round of iterations can be expressed by the following formula (10):

$$\mu^{(t)} = \mathcal{F}_{SCU}(C^{(t)}, \chi) = \mathcal{F}_{SCU}(<C^{(t)}>_A + <C^{(t)}>_B, \chi) = \frac{\sum_{i=1}^{n} <I^{(t)}\{C_i = j\}> \chi_i}{\sum_{i=1}^{n} <I^{(t)}\{C_i = j\}>} = \frac{(<C^{(t)}>_A + <C^{(t)}>_B)^T \chi}{1_{1*n}(<C^{(t)}>_A + <C^{(t)}>_B)}; \tag{10}$$

In the formula, $\chi_i$ represents the $i^{th}$ sample object, $c_i$ represents a cluster that the $i^{th}$ sample object belongs to, and $<I^{(t)}\{c_i=j\}>$ represents an indication function in the $i^{th}$ round of iterations, existing in the form of a partition. Partitions are held by the first party A and the second party B, respectively. If $c_i=j$, the value is equal to 1; otherwise, the value is equal to 0, where j is an integer within [1, k]. $(<C^{(t)}>_A+<C^{(t)}>_B)^T\chi$ can determine the sum of the feature vectors of the sample objects belonging to the clusters, and $1_{1*n}(<C^{(t)}>_A+<C^{(t)}>_B)$ can determine the quantity of the sample objects belonging to the clusters.

When the first feature matrix XA and the second feature matrix XB are data in the form of horizontal partition, for the process of updating the centroid of the $j^{th}$ cluster, the above-mentioned formula (10) can be transformed into the following formula (11):

$$\mu_j^{(t)} = \frac{(<C^{(t)}>_A + <C^{(t)}>_B)_j^T \chi}{1_{1*n}(<C^{(t)}>_A + <C^{(t)}>_B)_j} = \frac{(<C^{(t)}>_A + <C^{(t)}>_B)_j^T \begin{bmatrix} XA \\ XB \end{bmatrix}}{1_{1*n}(<C^{(t)}>_A + <C^{(t)}>_B)_j} = \frac{\begin{bmatrix} (<C^{(t)}>_A + <C^{(t)}>_B)_j^T XA \\ (<C^{(t)}>_A + <C^{(t)}>_B)_j^T XB \end{bmatrix}}{1_{1*n}(<C^{(t)}>_A + <C^{(t)}>_B)_j} =; \tag{11}$$

When the first feature matrix XA and the second feature matrix XB are data in the form of vertical partition, for the process of updating the centroid of the $j^{th}$ cluster, the above-mentioned formula (10) can be transformed into the following formula (12):

$$\mu_j^{(t)} = \frac{(<C^{(t)}>_A + <C^{(t)}>_B)_j^T \chi}{1_{1*n}(<C^{(t)}>_A + <C^{(t)}>_B)_j} = \frac{(<C^{(t)}>_A + <C^{(t)}>_B)_j^T [XA, XB]}{1_{1*n}(<C^{(t)}>_A + <C^{(t)}>_B)_j}; \tag{12}$$

When the first feature matrix XA and the second feature matrix XB are data in the form of original feature partitions, for the process of updating the centroid of the $j^{th}$ cluster, the above-mentioned formula (10) can be transformed into the following formula (13):

$$\mu_j^{(t)} = \frac{(<C^{(t)}>_A + <C^{(t)}>_B)_j^T \chi}{1_{1*n}(<C^{(t)}>_A + <C^{(t)}>_B)_j} = \frac{(<C^{(t)}>_A + <C^{(t)}>_B)_j^T [XA + XB]}{1_{1*n}(<C^{(t)}>_A + <C^{(t)}>_B)_j}; \tag{13}$$

In the process of updating the centroid of the $j^{th}$ cluster, with respect to the denominators in formulas (10) and (11), $$<C_j^{(t)}>_A^T XA$$

can be calculated locally by the first party A;

$$<C_j^{(t)}>_B^T XB$$

can be calculated locally by the second party B; for $$<C_j^{(t)}>_B^T XA \text{ and } <C_j^{(t)}>_A^T XB,$$

the first party A and the second party B need to perform secure matrix multiplication so that the first party A and the second party B respectively obtain corresponding partitions. Here, $$<C_j^{(t)}>_A^T$$

represents transposition of an index value partition corresponding to the $j^{th}$ cluster in the first index partition, and $$<C_j^{(t)}>_B^T$$

represents transposition of an index value partition corresponding to the $j^{th}$ cluster in the second index partition.

Next, the first party A obtains a first sum partition of the sum of the feature vectors of the sample objects belonging to the $j^{th}$ cluster based on a partition of $$<C_j^{(t)}>_A^T XA$$

calculated locally by the first party A, and a partition of $$<C_j^{(t)}>_B^T XA$$

and a partition of $$<C_j^{(t)}>_B^T XB$$

obtained by performing secure matrix multiplication with the second party B. Similarly, the second party B obtains a second sum partition of the sum of the feature vectors of the sample objects belonging to the $j^{th}$ cluster based on a partition of $$<C_j^{(t)}>_B^T XB$$

calculated locally by the second party B, and a partition of $$<C_j^{(t)}>_B^T XA$$

and a partition of $$<C_j^{(t)}>_A^T XB$$

obtained by performing secure matrix multiplication with the first party A.

For the numerators in formulas (11), (12), and (13), the first party A needs to perform a secure calculation based on $$<C_j^{(t)}>_A^T \text{ and } <C_j^{(t)}>_B^T$$

that is held by the second party B to count the quantity of sample objects belonging to the $j^{th}$ cluster. In some implementations, it is possible that both the first party A and the second party B hold the quantity of sample objects belonging to each cluster. In some other implementations, it is possible that the first party A holds a first quantity partition of the quantity of sample objects of the $j^{th}$ cluster, and the second party B holds a second quantity partition of the quantity of sample objects of the $j^{th}$ cluster.

It can be understood from formulas (11), (12), and (13) that, a division operation needs to be performed, and the division operation can be converted into a multiplication operation during actual calculation. Correspondingly, the first party A performs secure matrix multiplication based on the first sum partition and the quantity of sample objects belonging to each cluster, as well as the second sum partition held by the second party B to obtain an updated centroid partition corresponding to the $j^{th}$ cluster in the current round of iterations.

Then, after obtaining a partition of the updated centroid of each cluster, the first party A combines the partitions of the updated centroids of all clusters to obtain the updated first centroid partition. Similarly, after obtaining another partition of the updated centroid of each cluster, the second party B combines the other partitions of the updated centroids of all clusters to obtain the updated second centroid partition.

In some embodiments, a multi-party secure calculation is performed between the first party and the second party to perform data clustering while protecting the private data of both parties. In addition, in the distance calculation process, the first multi-party secure calculation is a calculation based on secure matrix multiplication so that a distance partition of the distance matrix representing the distances between all the sample objects and the current centroids of the clusters is obtained by performing the matrix secure calculation once, thereby reducing the calculation amount and the communication traffic in the clustering process and improving the data clustering efficiency.

In some embodiments of this specification, calculating a partition of the distance matrix and a centroid partition through a sparse matrix multiplication optimizes a case with an excessively large calculation amount in a sparse scenario and is applicable to secure calculation of matrix multiplication in a sparse scenario.

In some embodiments, the round of iterations further includes:

Step 41: The first party A performs a secure calculation including a secure comparison calculation with the second party B based on the first centroid partition $<\mu^{(t)}>_A$ of the current centroid matrix $\mu^{(t-1)}$, the updated first centroid partition $<\mu^{(t)}>_A$ in the current round of iterations, and a predetermined error threshold e to obtain a comparison result between the predetermined error threshold e and a difference between an updated centroid matrix $\mu^{(t)}$ in the current round of iterations and the current centroid matrix $\mu^{(t-1)}$, and determines whether a predetermined iteration stop condition is satisfied based on the comparison result.

Specifically, the first party A can obtain a first difference partition of the difference between the current centroid matrix $\mu^{(t-1)}$ and the updated centroid matrix $\mu^{(t)}$ in the current round of iterations based on the first centroid partition $<\mu^{(t-1)}>_A$ of the current centroid matrix $\mu^{(t-1)}$ and the updated first centroid partition $<\mu^{(t)}>_A$ in the current round of iterations, and the second party B obtains a second difference partition of the difference between the current centroid matrix $\mu^{(t-1}$ and the updated centroid matrix $\mu^{(t)}$ in the current round of iterations based on the second centroid partition $<\mu^{(t-1)}>_B$ of the current centroid matrix $\mu^{(t-1)}$ held by the second party B and the updated second centroid partition $<\mu^{(t)}>_B$ in the current round of iterations. Further, the first party A performs a secure comparison calculation based on the first difference partition and the predetermined error threshold e as well as the second difference partition held by the second party B to obtain the comparison result. Further, the first party A determines whether a predetermined iteration stop condition is satisfied based on the comparison result.

If the comparison result represents that the difference between the updated centroid matrix in the current round of iterations and the current centroid matrix is not greater than the predetermined error threshold, the first party A determines that the predetermined iteration stop condition is satisfied. If the comparison result represents that the difference between the updated centroid matrix in the current round of iterations and the current centroid matrix is greater than the predetermined error threshold, the first party A determines that the predetermined iteration stop condition is not satisfied.

Specifically, it can be expressed by the following formula (14):

$$\mathcal{F}_{CSC}(\mu^{(t-1)}, \mu^{(t)}, e) \leftarrow CMP(\mathcal{F}_{ESD}(\mu^{(t-1)}, \mu^{(t)}), e); \tag{14}$$

In the formula, $\mathcal{F}_{ESD}(\mu^{(t-1)}, \mu^{(t)})$ represents a secure calculation of the difference between the current centroid matrix $\mu^{(t-1)}$ and the updated centroid matrix $\mu^{(t)}$ in the current round of iterations; $\mathcal{F}_{CSC}(\mu^{(t-1)}, \mu^{(t)}, e)$ and $CMP(\mathcal{F}_{ESD}(\mu^{(t-1)}, \mu^{(t)}), e)$ each represent a secure comparison calculation of the difference between the current centroid matrix $\mu^{(t-1)}$ and the updated centroid matrix $\mu^{(t)}$ in the current round of iterations, and a magnitude of the predetermined error threshold e.

In some embodiments, the round of iterations can further include:

Step 51: The first party A determines whether an iteration round reaches a predetermined iteration round threshold, and determines whether a predetermined iteration stop condition is satisfied based on a determination result. It can be understood that the first party A (and/or the second party B) can pre-store a predetermined iteration round threshold, update the centroid matrix, that is, the first party A obtains an updated first centroid partition, and the second party B obtains an updated second centroid partition, determine whether the current iteration round reaches the predetermined iteration round threshold, obtain a determination result, and then determine whether the predetermined iteration stop condition is satisfied based on the determination result. If it is determined that the current iteration round reaches the predetermined iteration round threshold, the first party A determines that the predetermined iteration round threshold is reached. If it is determined that the current iteration round does not reach the predetermined iteration round threshold, the first party A determines that the predetermined iteration round threshold is not reached.

After determining that the predetermined iteration round threshold is reached, the first party A can end the iteration process and perform a subsequent clustering process. When determining that the predetermined iteration round threshold is not reached, the first party A can continue to perform a next round of iterations.

In some embodiments, the method further includes:

Step 61: If the first party A determines that the predetermined iteration stop condition is satisfied, the first party A determines a cluster that each sample object belongs to based on the first index partition; and/or determines a centroid of each cluster based on the updated first centroid partition.

If the first party A determines that the difference between the updated centroid matrix in the current round of iterations and the current centroid matrix is not greater than the predetermined error threshold, and further determines that the predetermined iteration stop condition is satisfied, the first party A can consider that the updated centroid matrix in the current round of iterations is the same as the current centroid matrix. Correspondingly, the first party A can determine the cluster that each sample object belongs to based on the first index partition and the second index partition of the second party. Alternatively, the first party A can determine the centroid of each cluster based on the updated first centroid partition and the updated second centroid partition of the second party. Subsequently, the first party A determines the cluster that each sample object belongs to based on the determined centroid of each cluster.

If the first party A determines that the current iteration round reaches the predetermined iteration round threshold, and further determines that the predetermined iteration round threshold is reached, the first party A can determine the centroid of each cluster based on the updated first centroid partition and the updated second centroid partition of the second party. Subsequently, the first party A determines the cluster that each sample object belongs to based on the determined centroid of each cluster.

Some specific embodiments of this specification have been described previously, and some other embodiments fall within the scope of the appended claims. In some cases, actions or steps described in the claims can be performed in a sequence different from that in some embodiments and desired results can still be achieved. In addition, processes described in the accompanying drawings do not necessarily require a specific order or a sequential order shown to achieve the desired results. In some implementations, multitasking and parallel processing are also possible or may be advantageous.

Figure 5:
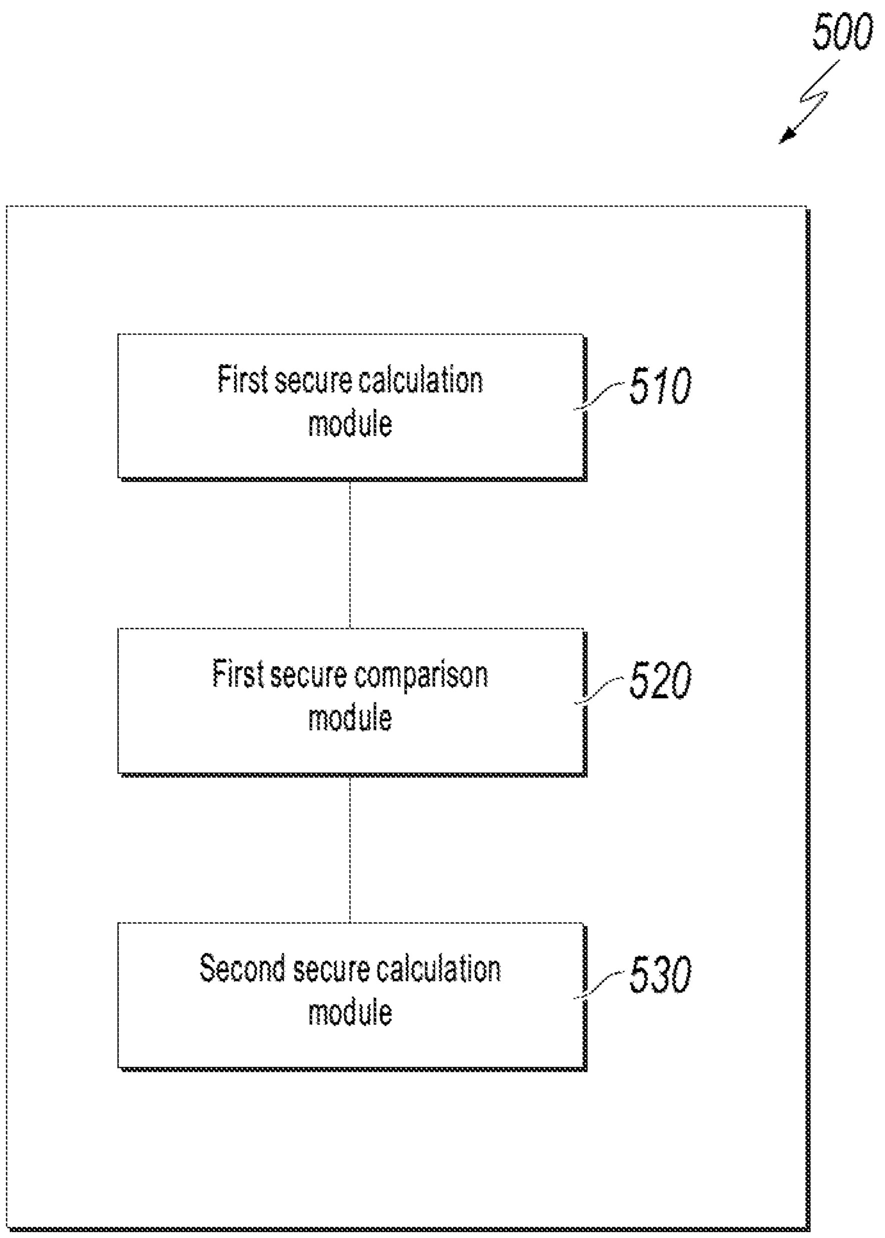
FIG. 5 is a schematic block diagram of an apparatus deployed in a first party, according to some embodiments.

Corresponding to some method embodiments described above, some embodiments of this specification provide a privacy-preserving multi-party joint data clustering apparatus 500. The apparatus involves a first party and a second party, the first party and the second party hold a first feature matrix and a second feature matrix, respectively, and the first feature matrix and the second feature matrix together comprise all sample objects to be clustered. The apparatus is deployed in the first party, a schematic block diagram of the apparatus is shown in FIG. 5, and the apparatus includes a first secure calculation module, a first secure comparison module, and a second secure calculation module that perform a plurality of rounds of iterations. Each round of iterations includes: the first secure calculation module 510, configured to perform a first multi-party secure calculation based on secure matrix multiplication with the second party based on the first feature matrix and a first centroid partition of a current centroid matrix to obtain a first distance partition of a distance matrix, where the distance matrix represents distances between all the sample objects and current centroids of clusters, and a second distance partition of the distance matrix is held by the second party; the first secure comparison module 520, configured to perform a secure comparison calculation with the second party with respect to the second distance partition held by the second party based on the first distance partition to obtain a first index partition of a cluster index matrix, where the cluster index matrix represents clusters that all the sample objects respectively belong to, and a second index partition of the cluster index matrix is held by the second party; and the second secure calculation module 530, configured to perform a second multi-party secure calculation with the second party based on the first feature matrix and the first index partition to obtain an updated first centroid partition in the current round of iterations, where an updated second centroid partition is held by the second party.

In some optional implementations, the first secure calculation module 510 includes: a first determination unit (not shown in the figure), configured to perform a secure calculation including secure matrix multiplication based on the first centroid partition and the second centroid partition held by the second party to determine a first intermediate result; a second determination unit (not shown in the figure), configured to perform a local computation based on the first feature matrix and the first centroid partition to determine a second intermediate result; a third determination unit (not shown in the figure), configured to perform secure matrix multiplication based on the first feature matrix and the second centroid partition held by the second party to determine a third intermediate result; a fourth determination unit (not shown in the figure), configured to perform secure matrix multiplication based on the first centroid partition and the second feature matrix held by the second party to determine a fourth intermediate result; and a fifth determination unit (not shown in the figure), configured to determine the first distance partition based on the first intermediate result, the second intermediate result, the third intermediate result, and the fourth intermediate result.

In some optional implementations, the first feature matrix is a matrix of all features of a first portion of all the sample objects, the second feature matrix is a matrix of all features of a second portion of all the sample objects, and each of the current centroid matrix and the first centroid partition has k*d dimensions, where d represents a dimension of all the features and k represents a predetermined cluster number.

In some optional implementations, the first feature matrix is a matrix of a first portion of features of all the sample objects and the second feature matrix is a matrix of a second portion of features of all the sample objects; the current centroid matrix includes a first submatrix corresponding to the first portion of features and a second submatrix corresponding to the second portion of features; the first centroid partition includes a first-party partition of the first submatrix and a first-party partition of the second submatrix; the second centroid partition includes a second-party partition of the first submatrix and a second-party partition of the second submatrix; the third determination unit is specifically configured to perform secure matrix multiplication based on the first feature matrix and the second-party partition of the first submatrix held by the second party to obtain the third intermediate result; the fourth determination unit is specifically configured to perform secure matrix multiplication based on the first-party partition of the second submatrix and the second feature matrix held by the second party to obtain the fourth intermediate result.

In some optional implementations, the first feature matrix is a matrix of first feature partitions of all features of all the sample objects, the second feature matrix is a matrix of second feature partitions of all features of all the sample objects, and each of the current centroid matrix and the first centroid partition has k*d dimensions, where d represents a dimension of all the features and k represents a predetermined cluster number.

In some optional implementations, the secure matrix multiplication is a general matrix multiplication based on a secret sharing protocol, or a sparse matrix multiplication based on a homomorphic encryption protocol and a secret sharing protocol.

In some optional implementations, the secure matrix multiplication is a sparse matrix multiplication based on a homomorphic encryption protocol and a secret sharing protocol; the third determination unit is specifically configured to: obtain a second centroid partition ciphertext, where the second centroid partition ciphertext is obtained by the second party by performing homomorphic encryption on the second centroid partition by using the first target public key; calculate a product of the first feature matrix and the second centroid partition ciphertext to obtain a first product ciphertext; generate a first random matrix as a first result partition of the first product ciphertext, and use the first result partition as the third intermediate result; and determine a second result partition ciphertext of the first product ciphertext based on the first product ciphertext and the first random matrix, and send the second result partition ciphertext to the second party so that the second party decrypts the second result partition ciphertext to obtain a second result partition as a second-party intermediate result corresponding to the third intermediate result.

In some optional implementations, the secure matrix multiplication is a sparse matrix multiplication based on a homomorphic encryption protocol and a secret sharing protocol; the third determination unit is specifically configured to: encrypt the first feature matrix by using the second target public key to obtain a first matrix ciphertext, and send the first matrix ciphertext to the second party; and receive a third result partition ciphertext from the second party, and decrypt the third result partition ciphertext to obtain a third result partition plaintext as the third intermediate result, where the third result partition ciphertext is determined by the second party based on a second product ciphertext and a second random matrix generated by the second party, the second product ciphertext is a product result of the first matrix ciphertext and the second centroid partition held by the second party, and the second random matrix is used as a second-party intermediate result held by the second party corresponding to the third intermediate result.

In some optional implementations, the first secure comparison module 520 is configured to: construct leaf nodes of a binary tree based on a predetermined cluster number k; with respect to two adjacent clusters among clusters indicated by layer nodes of the binary tree for any sample object, execute a secure comparison algorithm with the second party by using two distance value partitions of the sample object corresponding to the two clusters in the first distance partition to obtain a cluster with a closer distance as a next layer node until a root node is reached; and determine the first index partition based on a root node of each sample object.

In some optional implementations, the second secure calculation module 530 is specifically configured to: perform secure matrix multiplication based on the first feature matrix and the first index partition as well as the second feature matrix and the second index partition held by the second party to determine a first sum partition of a sum of feature vectors of sample objects belonging to clusters, where a second sum partition of the sum of the feature vectors of the sample objects belonging to the clusters is held by the second party; perform a secure calculation with the second party based on the first index partition to count a quantity of the sample objects belonging to the clusters; and perform secure matrix multiplication with the second party with respect to the second sum partition held by the second party based on the first sum partition and the quantity of the sample objects belonging to the clusters to obtain the updated first centroid partition in the current round of iterations.

In some optional implementations, the apparatus further includes: a second secure comparison module (not shown in the figure), configured to perform a secure comparison calculation with the second party based on the first centroid partition of the current centroid matrix, the updated first centroid partition in the current round of iterations, and a predetermined error threshold to obtain a comparison result between the predetermined error threshold and a difference between an updated centroid matrix in the current round of iterations and the current centroid matrix, and determine whether a predetermined iteration stop condition is satisfied based on the comparison result.

In some optional implementations, the apparatus further includes: a first determination module (not shown in the figure), configured to determine whether an iteration round reaches a predetermined iteration round threshold, and determine whether a predetermined iteration stop condition is satisfied based on a determination result.

In some optional implementations, the apparatus further includes: a second determination module (not shown in the figure), configured to: if the predetermined iteration stop condition is satisfied, determine a cluster that each sample object belongs to based on the first index partition; and/or determine a centroid of each cluster based on the updated first centroid partition.

Some apparatus embodiments described above correspond to some method embodiments. For detailed description, references can be made to the description of some method embodiments, and details are omitted for simplicity. Some apparatus embodiments are obtained based on the corresponding some method embodiments, and have the same technical effects as the corresponding some method embodiments. For detailed description, references can be made to the corresponding some method embodiments.

Some embodiments of this specification further provide a computer-readable storage medium, which stores a computer program. When the computer program is executed in a computer, the computer is enabled to perform the privacy-preserving multi-party joint data clustering method provided in this specification.

Some embodiments of this specification further provide a computing device, including a memory and a processor. The memory stores executable code, and the processor executes the executable code to implement the privacy-preserving multi-party joint data clustering method provided in this specification.

Some embodiments in this specification are described in a progressive way. For same or similar parts of some embodiments, mutual references can be made to some embodiments. Each embodiment focuses on a difference from other embodiments. Particularly, some storage medium embodiments and some computing device embodiments are basically similar to some method embodiments, and therefore are described briefly. For a related part, references can be made to the corresponding descriptions in some method embodiments.

A person skilled in the art should be aware that in the above-mentioned one or more examples, functions described in some embodiments of this application can be implemented by hardware, software, firmware, or any combination thereof. When being implemented by software, these functions can be stored in a computer-readable medium or transmitted as one or more instructions or code in the computer-readable medium.

The objectives, technical solutions, and beneficial effects of some embodiments of this application have been described in more detail with reference to the above-mentioned some specific implementations. It should be understood that the previous descriptions are merely some specific implementations of some embodiments of this application and are not intended to limit the protection scope of this application. Any modification, equivalent replacement, or improvement made based on the technical solutions of this application shall fall within the protection scope of this application.

What is claimed is:

1. A computer-implemented method comprising:

at a current iteration of multiple data clustering iterations:

performing, by a first party that holds first matrix data comprising a first feature matrix and a first centroid partition of a current centroid matrix, a first multi-party secure calculation with a second party that holds second matrix data comprising a second feature matrix and a second centroid partition of the current centroid matrix to obtain a first distance partition of a distance matrix, wherein the first feature matrix and the second feature matrix each represents features of sample objects to be clustered, wherein the distance matrix represents distances between the sample objects and current centroids of clusters, and wherein performing the first multi-party secure calculation comprises performing one or more secure matrix multiplications based on both a homomorphic encryption protocol and a secret sharing protocol between at least a portion of the first matrix data held by the first party and at least a portion of the second matrix data held by the second party;

performing, by the first party, based on the first distance partition held by the first party, a secure comparison calculation with the second party with respect to a second distance partition of the distance matrix held by the second party to obtain a first index partition of a cluster index matrix, wherein the cluster index matrix indicates clusters that the sample objects respectively belong to; and performing, by the first party that holds the first feature matrix and the first index partition, a second multi-party secure calculation with the second party that holds the second feature matrix and a second index partition of the cluster index matrix to obtain an updated first centroid partition in the current iteration.

2. The computer-implemented method of claim 1, wherein performing the first multi-party secure calculation comprises:

performing a secure calculation comprising a secure matrix multiplication based on the first centroid partition held by the first party and the second centroid partition held by the second party to determine a first intermediate result;

performing a local computation based on the first feature matrix and the first centroid partition to determine a second intermediate result;

performing a secure matrix multiplication based on the first feature matrix held by the first party and the second centroid partition held by the second party to determine a third intermediate result;

performing a secure matrix multiplication based on the first centroid partition held by the first party and the second feature matrix held by the second party to determine a fourth intermediate result; and determining the first distance partition based on the first intermediate result, the second intermediate result, the third intermediate result, and the fourth intermediate result.

3. The computer-implemented method of claim 2, wherein the first feature matrix comprises features of a first portion of the sample objects, and the current centroid matrix and the first centroid partition each has a dimension of k*d, wherein d represents a dimension of all the features and k represents a predetermined cluster number.

4. The computer-implemented method of claim 2, wherein the first feature matrix comprises a first portion of features of the sample objects and the second feature matrix comprises a second portion of the features of the sample objects;

the current centroid matrix comprises a first submatrix corresponding to the first portion of features and a second submatrix corresponding to the second portion of features;

the first centroid partition comprises a first-party partition of the first submatrix and a first-party partition of the second submatrix;

the second centroid partition comprises a second-party partition of the first submatrix and a second-party partition of the second submatrix;

determining the third intermediate result comprises performing a secure matrix multiplication based on the first feature matrix and the second-party partition of the first submatrix held by the second party to obtain the third intermediate result; and determining the fourth intermediate result comprises performing a secure matrix multiplication based on the first-party partition of the second submatrix and the second feature matrix held by the second party to obtain the fourth intermediate result.

5. The computer-implemented method of claim 2, wherein the one or more secure matrix multiplications comprise a general matrix multiplication based on the secret sharing protocol.

6. The computer-implemented method of claim 2, wherein the one or more secure matrix multiplications comprise a sparse matrix multiplication based on the homomorphic encryption protocol and the secret sharing protocol; and wherein determining the third intermediate result comprises:

obtaining a second centroid partition ciphertext, wherein the second centroid partition ciphertext is obtained by the second party by performing homomorphic encryption on the second centroid partition by using a first target public key;

calculating a product of the first feature matrix and the second centroid partition ciphertext to obtain a first product ciphertext;

generating a first random matrix as a first result partition of the first product ciphertext, and using the first result partition as the third intermediate result;

determining a second result partition ciphertext of the first product ciphertext based on the first product ciphertext and the first random matrix; and sending the second result partition ciphertext to the second party, so that the second party decrypts the second result partition ciphertext to obtain a second result partition as a second-party intermediate result corresponding to the third intermediate result.

7. The computer-implemented method of claim 2, wherein the one or more secure matrix multiplications comprise a sparse matrix multiplication based on the homomorphic encryption protocol and the secret sharing protocol, and wherein determining the third intermediate result comprises:

encrypting the first feature matrix by using a second target public key to obtain a first matrix ciphertext, and sending the first matrix ciphertext to the second party;

receiving a third result partition ciphertext from the second party; and decrypting the third result partition ciphertext to obtain a third result partition plaintext as the third intermediate result, wherein the third result partition ciphertext is determined by the second party based on a second product ciphertext and a second random matrix generated by the second party, wherein the second product ciphertext is a product result of the first matrix ciphertext and the second centroid partition, and wherein the second random matrix is used as a second-party intermediate result held by the second party corresponding to the third intermediate result.

8. The computer-implemented method of claim 1, wherein the first feature matrix comprises first feature partitions of features of the sample objects, the second feature matrix comprises second feature partitions of features of the sample objects, and the current centroid matrix and the first centroid partition each has a dimension of k*d, wherein d represents a dimension of the features and k represents a predetermined cluster number.

9. The computer-implemented method of claim 1, wherein obtaining the first index partition of the cluster index matrix comprises:

constructing leaf nodes of a binary tree based on a predetermined cluster number k;

executing, with respect to two adjacent clusters among clusters indicated by layer nodes of the binary tree for each sample object, a secure comparison algorithm with the second party by using two distance value partitions of the sample object corresponding to the two adjacent clusters in the first distance partition to determine, as a next layer node, one cluster of the two adjacent clusters that has a closer distance, until a root node is reached; and determining the first index partition based on a root node of each sample object.

10. The computer-implemented method of claim 1, wherein obtaining the updated first centroid partition in the current iteration comprises:

performing a secure matrix multiplication between (i) the first feature matrix and the first index partition and (ii) the second feature matrix and the second index partition held by the second party to determine a first sum partition of a sum of feature vectors of sample objects belonging to clusters, wherein a second sum partition of the sum of the feature vectors of the sample objects belonging to the clusters is held by the second party;

performing a secure calculation with the second party based on the first index partition to count a quantity of the sample objects belonging to the clusters; and performing a secure matrix multiplication with the second party with respect to the second sum partition based on the first sum partition and the quantity of the sample objects belonging to the clusters to obtain the updated first centroid partition in the current iteration.

11. The computer-implemented method of claim 1, wherein the method further comprises, at the current iteration:

performing a secure comparison calculation with the second party based on (i) the first centroid partition of the current centroid matrix, (ii) the updated first centroid partition in the current iteration, and (iii) a predetermined error threshold to obtain a comparison result between the predetermined error threshold and a difference between an updated centroid matrix in the current iteration and the current centroid matrix; and determining whether a predetermined stop condition is satisfied based on the comparison result.

12. The computer-implemented method of claim 1, wherein the method further comprises, at the current iteration:

determining whether the current iteration satisfies a predetermined iteration number threshold; and determining whether a predetermined stop condition is satisfied based on determining whether the current iteration satisfies the predetermined iteration number threshold.

13. The computer-implemented method of claim 12, further comprising:

in response to determining that the predetermined stop condition is satisfied, performing one or both of:

determining a cluster that each sample object belongs to based on the first index partition, or determining a centroid of each cluster based on the updated first centroid partition.

14. A non-transitory, computer-readable medium storing one or more instructions executable by a computer system to perform operations comprising:

at a current iteration of multiple data clustering iterations:

performing, by a first party that holds first matrix data comprising a first feature matrix and a first centroid partition of a current centroid matrix, a first multi-party secure calculation with a second party that holds second matrix data comprising a second feature matrix and a second centroid partition of the current centroid matrix to obtain a first distance partition of a distance matrix, wherein the first feature matrix and the second feature matrix each represents features of sample objects to be clustered, wherein the distance matrix represents distances between the sample objects and current centroids of clusters, and wherein performing the first multi-party secure calculation comprises performing one or more secure matrix multiplications based on both a homomorphic encryption protocol and a secret sharing protocol between at least a portion of the first matrix data held by the first party and at least a portion of the second matrix data held by the second party;

performing, by the first party, based on the first distance partition held by the first party, a secure comparison calculation with the second party with respect to a second distance partition of the distance matrix held by the second party to obtain a first index partition of a cluster index matrix, wherein the cluster index matrix indicates clusters that the sample objects respectively belong to; and performing, by the first party that holds the first feature matrix and the first index partition, a second multi-party secure calculation with the second party that holds the second feature matrix and a second index partition of the cluster index matrix to obtain an updated first centroid partition in the current iteration.

15. A system, comprising:

one or more computers; and one or more computer memory devices interoperably coupled with the one or more computers and having tangible, non-transitory, machine-readable media storing one or more instructions that, when executed by the one or more computers, perform operations comprising:

at a current iteration of multiple data clustering iterations:

performing, by a first party that holds first matrix data comprising a first feature matrix and a first centroid partition of a current centroid matrix, a first multi-party secure calculation with a second party that holds second matrix data comprising a second feature matrix and a second centroid partition of the current centroid matrix to obtain a first distance partition of a distance matrix, wherein the first feature matrix and the second feature matrix each represents features of sample objects to be clustered, wherein the distance matrix represents distances between the sample objects and current centroids of clusters, and wherein performing the first multi-party secure calculation comprises performing one or more secure matrix multiplications based on both a homomorphic encryption protocol and a secret sharing protocol between at least a portion of the first matrix data held by the first party and at least a portion of the second matrix data held by the second party;

performing, by the first party, based on the first distance partition held by the first party, a secure comparison calculation with the second party with respect to a second distance partition of the distance matrix held by the second party to obtain a first index partition of a cluster index matrix, wherein the cluster index matrix indicates clusters that the sample objects respectively belong to; and performing, by the first party that holds the first feature matrix and the first index partition, a second multi-party secure calculation with the second party that holds the second feature matrix and a second index partition of the cluster index matrix to obtain an updated first centroid partition in the current iteration.

16. The system of claim 15, wherein performing the first multi-party secure calculation comprises:

performing a secure calculation comprising a secure matrix multiplication based on the first centroid partition held by the first party and the second centroid partition held by the second party to determine a first intermediate result;

performing a local computation based on the first feature matrix and the first centroid partition to determine a second intermediate result;

performing a secure matrix multiplication based on the first feature matrix held by the first party and the second centroid partition held by the second party to determine a third intermediate result;

performing a secure matrix multiplication based on the first centroid partition held by the first party and the second feature matrix held by the second party to determine a fourth intermediate result; and determining the first distance partition based on the first intermediate result, the second intermediate result, the third intermediate result, and the fourth intermediate result.

17. The system of claim 16, wherein the first feature matrix comprises features of a first portion of the sample objects, and the current centroid matrix and the first centroid partition each has a dimension of k*d, wherein d represents a dimension of all the features and k represents a predetermined cluster number.

18. The system of claim 16, wherein the first feature matrix comprises a first portion of features of the sample objects and the second feature matrix comprises a second portion of the features of the sample objects;

the current centroid matrix comprises a first submatrix corresponding to the first portion of features and a second submatrix corresponding to the second portion of features;

the first centroid partition comprises a first-party partition of the first submatrix and a first-party partition of the second submatrix;

the second centroid partition comprises a second-party partition of the first submatrix and a second-party partition of the second submatrix;

determining the third intermediate result comprises performing a secure matrix multiplication based on the first feature matrix and the second-party partition of the first submatrix held by the second party to obtain the third intermediate result; and determining the fourth intermediate result comprises performing a secure matrix multiplication based on the first-party partition of the second submatrix and the second feature matrix held by the second party to obtain the fourth intermediate result.

19. The system of claim 16, wherein the one or more secure matrix multiplications comprise a general matrix multiplication based on the secret sharing protocol.

20. The system of claim 15, wherein the first feature matrix comprises first feature partitions of features of the sample objects, the second feature matrix comprises second feature partitions of features of the sample objects, and the current centroid matrix and the first centroid partition each has a dimension of k*d, wherein d represents a dimension of the features and k represents a predetermined cluster number.

* * * * *